US010975620B2

(12) United States Patent
Faller

(10) Patent No.: US 10,975,620 B2
(45) Date of Patent: Apr. 13, 2021

(54) POSITION LOCK FOR ROLLER SUPPORTED ARCHITECTURAL COVERINGS

(71) Applicant: Hunter Douglas, Inc., Pearl River, NY (US)

(72) Inventor: Kenneth M. Faller, Thornton, CO (US)

(73) Assignee: Hunter Douglas, Inc., Pearl River, NY (US)

( * ) Notice: Subject to any disclaimer, the term of this patent is extended or adjusted under 35 U.S.C. 154(b) by 317 days.

(21) Appl. No.: 15/973,134

(22) Filed: May 7, 2018

(65) Prior Publication Data

US 2018/0258696 A1 Sep. 13, 2018

Related U.S. Application Data

(63) Continuation of application No. 14/766,155, filed on Aug. 6, 2015, now Pat. No. 9,963,935, and a (Continued)

(51) Int. Cl.
*E06B 9/80* (2006.01)
*E06B 9/34* (2006.01)
(Continued)

(52) U.S. Cl.
CPC .................. *E06B 9/80* (2013.01); *E06B 9/34* (2013.01); *E06B 9/90* (2013.01); *E06B 2009/2435* (2013.01); *E06B 2009/2627* (2013.01)

(58) Field of Classification Search
CPC ..... E06B 9/80; E06B 9/90; E06B 9/34; E06B 9/42; E06B 9/44; E06B 9/60;
(Continued)

(56) References Cited

U.S. PATENT DOCUMENTS 1,344,448 A 6/1920 Johnstone
2,175,549 A 10/1939 Nardulli
(Continued)

FOREIGN PATENT DOCUMENTS

CH 696497 A5 7/2007
CN 101349139 A 1/2009
(Continued)

OTHER PUBLICATIONS

Canadian Examination Report for corresponding Canadian Patent Application No. 2,900,218 dated Aug. 14, 2020, 4 pages.
(Continued)

*Primary Examiner* — Katherine W Mitchell
*Assistant Examiner* — Abe Massad
(74) *Attorney, Agent, or Firm* — Hoffman Warnick LLC

(57) ABSTRACT

A covering for architectural openings including a roller; a shade wrapped around the roller, the shade configured to extend from or retract onto the roller when the roller rotates; a retraction motor operably coupled to the roller for biasing the roller in a direction to retract the shade, wherein the retraction motor includes a spring having a first end rotatable with the roller and a second end fixed against rotation of the roller, wherein rotation of the roller unwraps or further wraps the spring to store energy therein; and a positioning device including: a circumferential track including at least one seat; and a pin engaging the circumferential track, wherein the pin selectively enters the at least one seat of the circumferential track to hold the shade, and is selectively releasable therefrom for additional extension or retraction.

15 Claims, 21 Drawing Sheets

Related U.S. Application Data continuation of application No. PCT/US2013/032634, filed on Mar. 15, 2013.

(51) Int. Cl.

*E06B 9/90* (2006.01)
*E06B 9/24* (2006.01)
*E06B 9/262* (2006.01)

(58) Field of Classification Search

CPC ..... E06B 2009/2435; E06B 2009/2627; E06B 2009/3222; E06B 2009/905

See application file for complete search history.

(56) References Cited

U.S. PATENT DOCUMENTS 2,245,902 A 6/1941 Cohn
2,723,715 A 11/1955 Kaufmann et al.
2,914,122 A 11/1959 Pinto
3,384,519 A † 5/1968 Froget
4,194,550 A 3/1980 Hopper
4,498,517 A † 2/1985 Mase
5,036,898 A 8/1991 Chen
5,099,906 A 3/1992 Chigusa et al.
5,123,472 A 6/1992 Nagashima et al.
5,285,838 A 2/1994 Rapp et al.
5,287,908 A 2/1994 Hoffmann et al.
5,301,737 A 4/1994 Martin
5,309,974 A 5/1994 Fraser
5,313,999 A 5/1994 Colson et al.
5,320,154 A 6/1994 Colson et al.
5,339,882 A 8/1994 Judkins
5,394,922 A 3/1995 Colson et al.
5,413,201 A * 5/1995 Vidal ................. B60K 17/3515 192/114 R
5,419,385 A 5/1995 Vogel et al.
5,421,221 A 6/1995 Warchocki
5,456,304 A 10/1995 Colson et al.
5,664,613 A 9/1997 Jelic
5,690,317 A 11/1997 Sandsborg
5,855,235 A 1/1999 Colson et al.
5,888,639 A 3/1999 Green et al.
6,001,199 A 12/1999 Colson et al.
6,024,819 A 2/2000 Corey
6,056,036 A † 5/2000 Todd
6,105,652 A 8/2000 Judkins
6,112,797 A 9/2000 Colson et al.
6,116,325 A 9/2000 Colson et al.
6,142,211 A 11/2000 Judkins
6,158,563 A 12/2000 Welfonder et al.
6,164,428 A 12/2000 Berman et al.
6,171,424 B1 1/2001 Barss
6,289,964 B1 9/2001 Colson et al.
6,302,982 B1 10/2001 Corey et al.
6,377,384 B2 4/2002 Corey et al.
6,435,252 B2 8/2002 Colson et al.
6,484,786 B1 11/2002 Ruggles et al.
6,529,323 B2 3/2003 Okumura
6,546,989 B2 4/2003 Coleman et al.
6,575,222 B2 6/2003 Corey et al.
6,634,409 B2 10/2003 Corey et al.
6,688,369 B2 2/2004 Colson et al.
6,688,370 B1 2/2004 Nien
6,745,811 B1 6/2004 Nien
6,782,938 B2 8/2004 Colson et al.
6,823,923 B2 11/2004 Palmer
6,948,544 B2 9/2005 Nien
7,128,121 B2 10/2006 Nien
7,267,156 B2 9/2007 Byeon
7,311,131 B2 12/2007 Nien et al.
7,380,582 B1 6/2008 Anderson et al.
7,401,634 B2 7/2008 Kovach et al.
7,438,115 B2 10/2008 Bohlen
7,500,505 B2 3/2009 Smith et al.
7,520,310 B2 4/2009 Colosio
7,540,315 B2 6/2009 Chen
7,549,455 B2 6/2009 Harper et al.
7,624,785 B2 12/2009 Yu et al.
7,665,507 B2 * 2/2010 Naoki ....................... E06B 9/42 160/308
7,717,156 B2 * 5/2010 Costello .................. B60R 5/047 160/317
7,836,937 B2 11/2010 Anderson et al.
8,281,846 B2 10/2012 Zhu
8,327,906 B2 12/2012 Kwak
8,356,653 B2 1/2013 Fu-Lai et al.
8,418,742 B2 4/2013 Anderson et al.
8,517,081 B2 8/2013 Huang
8,556,204 B2 10/2013 Kao
8,662,139 B2 3/2014 Anthony et al.
8,746,320 B2 6/2014 Yu et al.
8,763,674 B2 7/2014 Kataoka et al.
8,807,192 B2 8/2014 Marocco
9,322,210 B2 4/2016 Lukosiunas et al.
9,410,366 B2 8/2016 Kwak
2001/0037864 A1 11/2001 Colson et al.
2002/0048083 A1 4/2002 Okumura
2004/0226663 A1 11/2004 Smith et al.
2005/0150608 A1 7/2005 Auger et al.
2006/0272783 A1 12/2006 Smith et al.
2007/0079943 A1 4/2007 Smith et al.
2007/0102554 A1 5/2007 Chen
2007/0175595 A1 8/2007 Lin
2007/0175596 A1 8/2007 Chien
2008/0093038 A1 4/2008 Hansen
2008/0202709 A1 8/2008 Anderson et al.
2009/0020239 A1 1/2009 Yu et al.
2009/0223641 A1 9/2009 Cheng
2009/0242332 A1 10/2009 Anderson et al.
2010/0122780 A1 5/2010 Cheng
2010/0206495 A1 8/2010 Lin
2010/0314054 A1 12/2010 Zhu
2011/0031343 A1 * 2/2011 Anderson ................. E06B 9/50 242/396.4
2011/0100568 A1 5/2011 Kao
2011/0126959 A1 6/2011 Holt et al.
2011/0209836 A1 9/2011 Yu et al.
2012/0024485 A1 * 2/2012 Mullet ...................... E06B 9/44 160/313
2012/0048485 A1 * 3/2012 Fu-Lai .................... E06B 9/322 160/331
2012/0266413 A1 10/2012 Kao
2012/0298318 A1 11/2012 Wolek
2014/0138037 A1 5/2014 Colson et al.
2014/0216666 A1 8/2014 Smith et al.
2014/0262066 A1 9/2014 Certain et al.
2014/0262068 A1 9/2014 Buccola et al.
2014/0262069 A1 9/2014 Drew et al.
2015/0007946 A1 1/2015 Yu et al.
2015/0034257 A1 2/2015 Blair et al.
2015/0034260 A1 2/2015 Blair et al.
2015/0047792 A1 2/2015 Lukosiunas et al.
2015/0059991 A1 3/2015 Kwak
2015/0292261 A1 10/2015 Chou
2015/0368966 A1 12/2015 Faller
2016/0312531 A1 * 10/2016 Kwak ....................... E06B 9/60
2017/0167190 A1 * 6/2017 Brioschi ................... E06B 9/80

FOREIGN PATENT DOCUMENTS

CN 101476443 A 7/2009
CN 102733746 A 10/2012
EP 0705957 A1 4/1996
EP 0972906 A1 1/2000
EP 1947289 A2 7/2008
EP 2733302 A2 5/2014
FR 1521488 A 4/1968
GB 1125426 † 8/1968
JP 05179878 A 7/1993
JP H0628195 B2 4/1994
JP 07279560 A 10/1995
JP 08144667 A 6/1996
JP 09170390 A 6/1997

(56) References Cited

FOREIGN PATENT DOCUMENTS

| | | | |
|---|---|---|---|
| JP | 3077194 | U | 5/2001 |
| JP | 3371036 | B2 | 1/2003 |
| JP | 2008188470 | A | 8/2008 |
| JP | 2008231913 | A | 10/2008 |
| JP | 5189878 | B2 | 4/2013 |
| KR | 102006006012 | A | 6/2006 |
| KR | 100675556 | B1 | 2/2007 |
| KR | 100943408 | B1 | 2/2010 |
| KR | 20110139082 | A | 12/2011 |
| KR | 101259614 | B1 | 5/2013 |
| TW | 2012226690 | A | 7/2012 |
| WO | 9937876 | A | 7/1999 |
| WO | 2010041880 | A1 | 4/2010 |
| WO | 2011090975 | A1 | 7/2011 |
| WO | 2012006514 | A2 | 1/2012 |
| WO | 2013033014 | A1 | 3/2013 |
| WO | 2014115684 | A1 | 7/2014 |
| WO | 20140143057 | A1 | 9/2014 |
| WO | 2014163602 | A2 | 10/2014 |
| WO | 2014201253 | A2 | 12/2014 |
| WO | 2015030349 | A1 | 3/2015 |

OTHER PUBLICATIONS

Office Action and English Translation thereof for Korean Patent Application No. KR 10-2015-7023241 dated Jun. 24, 2019, 14 pages.
Office Action and English Translation thereof for Canadian Patent Application No. 2,900,218 dated Dec. 21, 2018, 6 pages.
CN Search Report issued in connection with corresponding CN Application No. 2013800742310 dated Jun. 6, 2017, 2 pages.
PCT International Search Report and Written Opinion for International Application No. PCT/US2013/032634, dated Jun. 5, 2013, 9 pages.

* cited by examiner
† cited by third party

R1
206
282
302
276
296
288
202
284
282
298
244
300

276
204
202

288
296
298
244
300

104
116
102
106
118
F
R1

POSITION LOCK FOR ROLLER SUPPORTED ARCHITECTURAL COVERINGS

CROSS REFERENCE TO RELATED APPLICATIONS

This patent application is a continuation of U.S. patent application Ser. No. 14/766,155, entitled "Position Lock for Roller Supported Architectural Coverings" and filed Aug. 6, 2015, the contents of which are incorporated herein by reference in its entirety.

BACKGROUND

Field

The present disclosure relates generally to retractable shades for architectural openings and more particularly to locks for positioning retractable shades at desired orientations and heights.

Related Art

Retractable shades have been popular for many years and generally extend across or are retracted from covering architectural openings such as windows, doorways, archways, and the like. Such retractable coverings may include a roller rotatably supported with a shade material suspended therefrom. The shade material can either be wrapped about the roller when retracting the shade or unwrapped from the roller when extending the shade.

Many retractable coverings are operated with flexible operating cords which may extend, for example, downwardly through or adjacent to the shade material to the bottom rail of the covering from the head rail and be operated from free ends of the cords. The free ends of the cords may be exposed adjacent to one end of a head rail for manipulation of an operator.

Operating and pull cords can be an issue with retractable coverings, as in some instances the cords may become tangled and difficult to use, fray or break, damage the covering from repeated wear, and may sometimes form loops that may present a risk to users.

SUMMARY

A covering for architectural openings including a roller, a shade wrapped around the roller, the shade extendable from the roller when the roller rotates in a first direction, and retractable onto the roller when the roller rotates in a second direction. The covering also includes a retraction mechanism operably associated with the roller for biasing the roller in a direction to retract the shade and a positioning device operably engaging the roller for selectively holding the shade at a selected extension location and selectively releasing the shade for additional extension or retraction. The positioning device is actuated to hold the shade at the selected extension position by movement of the shade in either the extension or retraction direction.

The positioning device of the covering may also include a spool having a length operably connected to the roller and selectively rotatably therewith, a shuttle at least partially received around the spool. In operation, as the roller rotates the shuttle translates along the length of the spool and when the shuttle is in a first position on the shuttle, the roller can rotate; and when the shuttle is in a second position on the shuttle the roller is prevented from rotating.

In some embodiments, of the positioning device, an outer surface of the spool defines a pin engagement surface defining a plurality of channels and the shuttle comprises at least one pin, wherein the at least one pin is configured to travel within the plurality of channels. The location of the at least one pin on the pin engagement surface determines whether the shuttle can rotate or whether the shuttle is prevented from rotating.

Additionally, the positioning device may further include an engagement disk operably connected to the roller and the spool and operably connecting the spool to the roller; a clutch operably connected to the engagement disk and the spool. During operation, when the shuttle is in the second position the clutch prevents the engagement disk from rotating, preventing the roller from rotating.

The positioning device may further include a retainer received around the spool and the shuttle. In these embodiments, the shuttle may include a plurality of translation features defined on an outer surface, the retainer may include a plurality of guide grooves defined an interior surface thereof. The translation features of the shuttle are received into the guide grooves of the retainer, and when the translation features are received into the guide grooves the shuttle translates along the length of the spool as the spool rotates.

In some embodiments, the positioning device may further include at least one locking pin and a spool having an outer surface defining a first pin seat and a second pin seat. When the locking pin is in the first pin seat, the positioning device locks the roller to hold the shade at the selected extension location and when the locking pin is in the second pin seat, the positioning device unlocks the roller. In these embodiments, the locking pin is defined on a shuttle, wherein the shuttle is received around the spool.

The positioning device may further include an engagement disk operably connecting the spool and the roller, wherein the engagement disk is rotatably connected to the roller. Additionally, the positioning device may further include a clutch spring having a spool tang and a disk tang, wherein the spool tang is operably connected to the spool and the disk tang is operably connected to the engagement disk, wherein the clutch spring selectively prevents the spool from rotating relative to the engagement disk.

A method for operating a covering for an architectural opening including moving a shade in a first direction to a first position and moving the shade in a second direction from the first position the hold the shade at the selected position. In the method for operating the covering, the first direction and the second direction are opposite one another.

In the method for operating the covering, the first direction can either wrap or unwrap the shade of the roller.

In the method for operating the covering, the first direction and the second direction may be opposite from one another. Additionally, the first direction may unwrap the shade from a roller or may wrap the shade from the roller.

A shade including a head railhead rail, a roller at least partially received within the head railhead rail and operably connected thereto, and at least one sheet operably connected to the roller. The shade also includes a retraction motor operably connected to the roller and a locking assembly operably connected to the head rail and the roller. The retraction motor exerts a biasing force to bias the roller in a first direction and the locking assembly selectively overcomes the biasing force of the retraction motor.

In some embodiments, the shade may further include a support rod operably connected to the head rail and the locking assembly. Additionally, the assembly may further include a spool rotatably associated with the roller; a shuttle received around a portion of the spool and traversable along a length of the spool; a retainer received around the spool and the shuttle and operably connected to the roller. During operation, the retainer prevents the shuttle from rotating with the spool.

In some embodiments of the shade, the spool defines a pin engagement surface defining a first engagement feature and the shuttle includes at least one pin, the at least one pin engages the pin engagement surface. The at least one pin engages the first engagement feature, the at least one pin substantially prevents the spool from rotating.

The locking assembly of the shade may also include a clutch spring operably connected between the spool and the roller, and when the pin engages the first engagement feature, the clutch is biased to a closed position.

This summary of the disclosure is given to aid understanding, and one of skill in the art will understand that each of the various aspects and features of the disclosure may advantageously be used separately in some instances, or in combination with other aspects and features of the disclosure in other instances.

Other aspects, features and details of the present disclosure can be more completely understood by reference to the following detailed description of a preferred embodiment, taken in conjunction with the drawings and from the appended claims.

DETAILED DESCRIPTION

Figure 1:
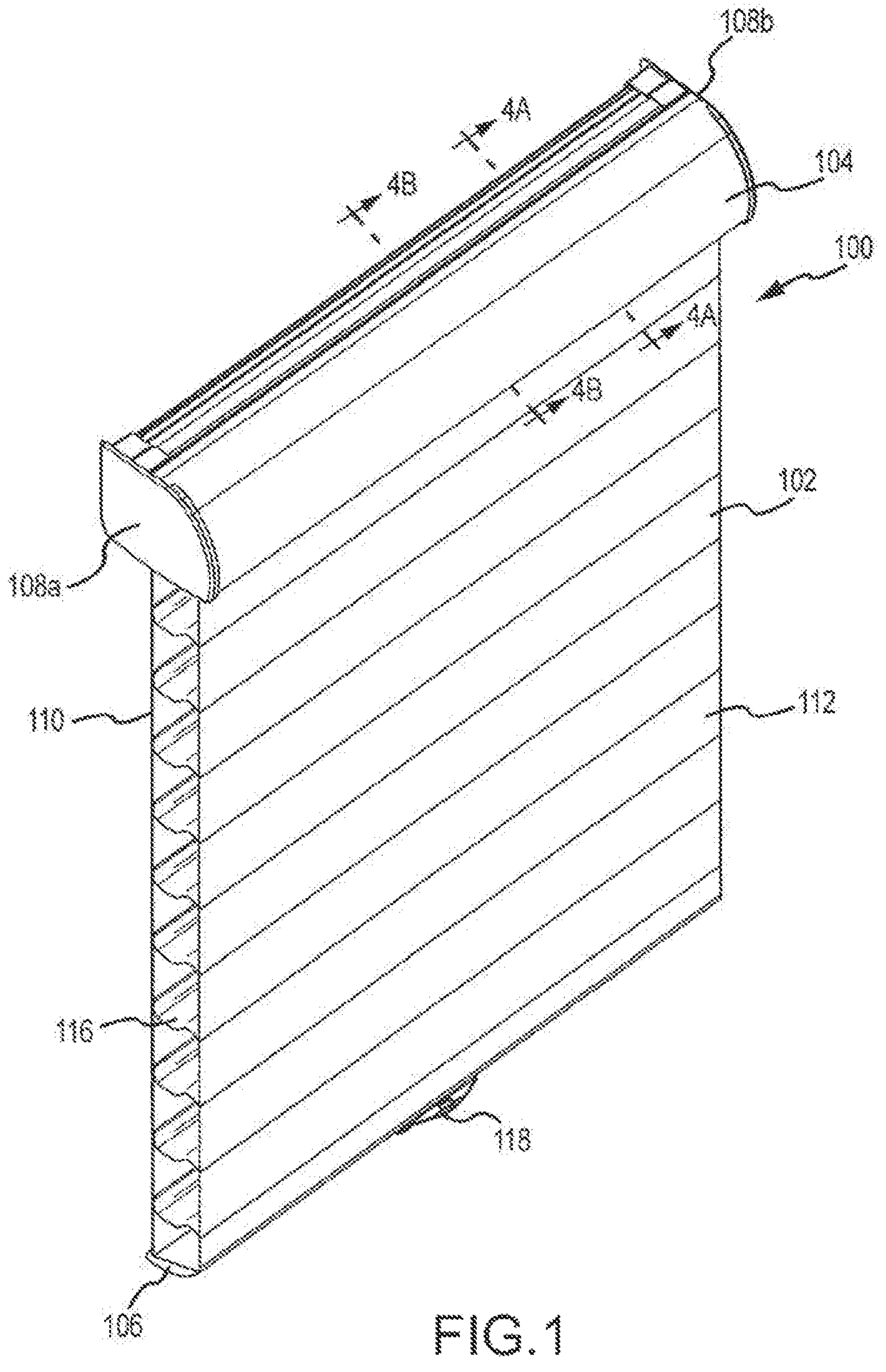
FIG. 1 is an isometric view of a retractable shade including a locking system of the present disclosure.

The present disclosure relates to a braking and/or positioning device for retractable coverings. The positioning device allows a retractable covering, such as a Silhouette by Hunter Douglas style shade, or the like, to be stopped at a number of different locations as selected by a user, along a drop length of the shade. For example, when the retractable covering is positioned within an architectural opening, such as a window, the positioning device may allow a user to select a vertical position for the retractable shade along a height of the architectural opening, and the positioning device may hold the retractable shade in the selected position (e.g., at a height desired by the user), whether the shade is being retracted is extended. The positioning device may be used in conjunction with a motor or manually powered system that may eliminate the need for operating cords. In one embodiment, the positioning device may be used with a retraction motor that may retract the shade (once released from the locked position) and/or may assist a user in retracting the shade. In these embodiments, the positioning device and the retraction motor may, in conjunction with a user applied force, may form an operating mechanism for the covering.

The positioning device or locking assembly may be configured to selectively prevent the retraction motor from retracting the shade. In some embodiments, the user may exert a force to extend the shade and when he or she reaches a desired position may remove the downward force. The positioning device may then lock the shade into the select position, preventing the retraction motor from retracting the shade. This may allow the shade to be locked a position substantially anywhere along the vertical drop length. When the user wishes to reposition the shade, e.g., further extend or retract the shade, the user may exert a downward force to disengage the positioning device. Once disengaged, the retraction motor may retract the shade or the user may further extend the shade by exerting a manual extension force (e.g., pulling down on an end rail of the shade).

The positioning device may include an engagement disk, a spring clutch, a spool, a shuttle, and a retainer. The spring clutch and the spool may be operably connected to the engagement disk. The shuttle may be received around the spool and the retainer may be received around the shuttle and a substantial portion of the spool.

The engagement disk and the spool are connected to the roller in order to rotate along with the roller, such that as the roller rotates, such as due to a user force pulling down on the shade, a force exerted by the retraction motor, or the like, the engagement disk and spool rotate correspondingly. Generally as the spool rotates, the shuttle translates laterally across the spool.

The shuttle may include one or more pins or traveling engagement members that travel along a surface of the spool in predefined pathways. The pathways may follow one or more channels engraved or recessed into the outer surface of the spool. For example, the channel walls may be contoured to selectively direct the pins into a particular pathway. The channel walls may also form one or more seats or parking locations for the pins, which may selectively retain the pins.

Depending on the rotation direction of the engagement disk, as well as the location of the shuttle relative to the spool, the spring clutch and pin may substantially prevent rotation of the engagement disk in a select direction. Since the engagement disk is keyed to the roller, the engagement disk may substantially prevent the roller from rotating in the selected direction. Thus, in the locked position, the spring clutch may prevent the retraction motor from retracting the shade.

Figure 2:
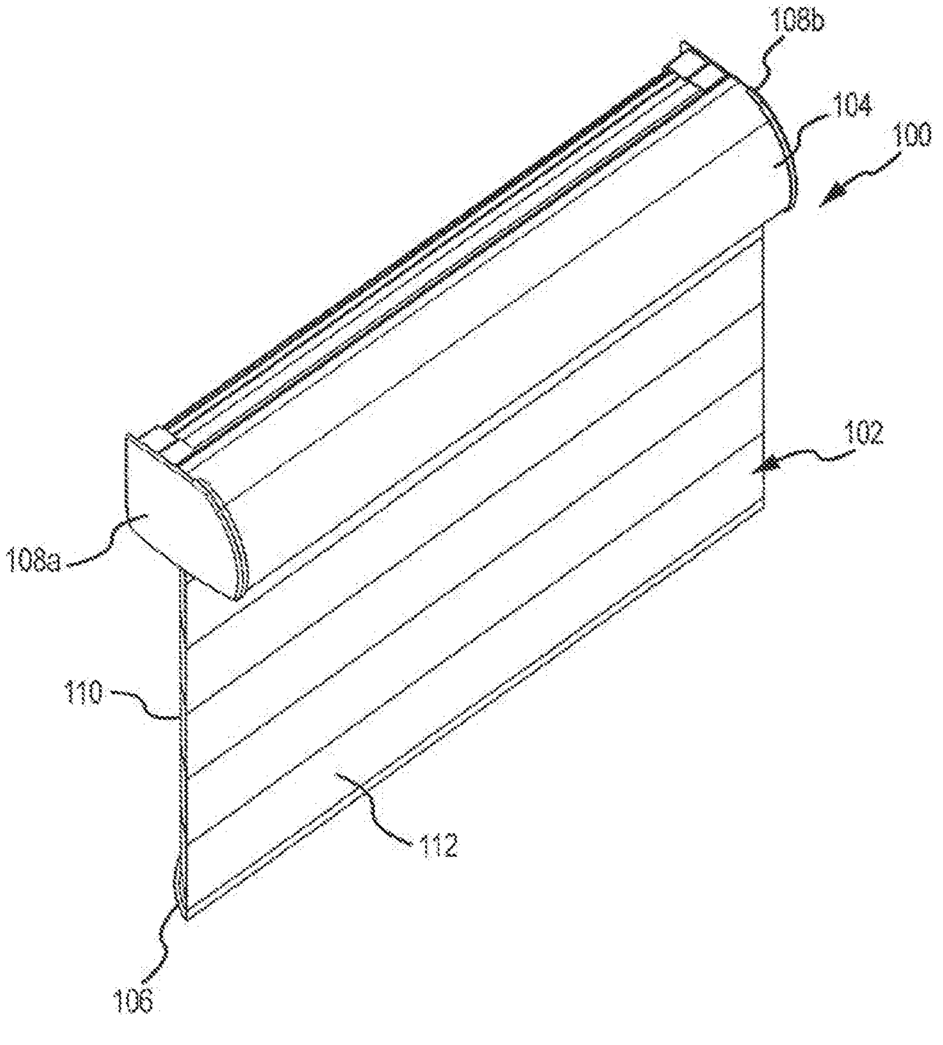
FIG. 2 is an isometric view of the retractable shade of FIG. 1 locked at a partially retracted position.

Turning now to the figures, an illustrative covering incorporating the positioning device will be discussed in more detail. FIG. 1 is a front isometric view of a covering for architectural openings in the fully extended position. FIG. 2 is a front isometric view of the covering of FIG. 1 partially extended. With reference to FIGS. 1 and 2, the covering 100 may include a shade 102 supported at its top end by a head rail 104. The head rail 104 may support the shade 102 over an architectural opening, such as a window, doorway, or the like. End caps 108*a*, 108*b* may be operably connected to opposing ends of the head rail 104. An end rail 106 may be operably connected to a bottom end of the shade 102. The end rail 106 may include a hand 118, which provides a gripping surface for a user so that a user may more easily the end rail 106.

The shade 102 may include a rear sheet 110 and a front sheet 112. The two sheets 110, 112 may be formed of substantially any material, such as, but not limited to, wovens, non-wovens, knits, and so on. Moreover, although the rear sheet 110 and front sheet 112 are illustrated as substantially continuous sheets, the sheets 110, 112 may be formed of multiple strips or pieces of material sewed, glued, or otherwise operably connected together. Although the shade 102 is discussed as having two sheets, in some examples, the sheet may include only a single sheet or more than two sheets.

Figure 4A:
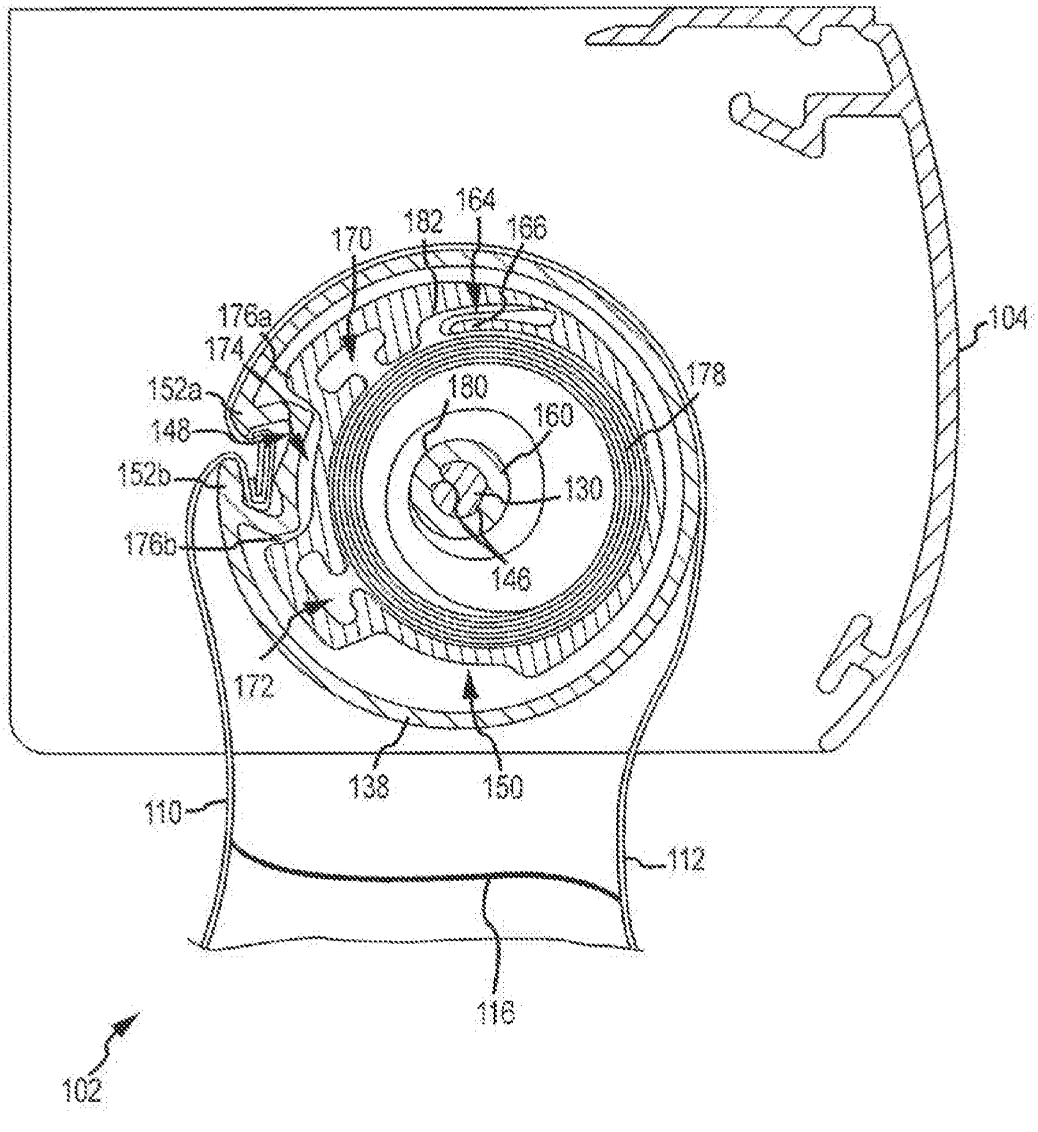
FIG. 4A is a cross-section view of the retractable shade of FIG. 1 taken along line 4A-4A in FIG. 1.
Figure 4B:
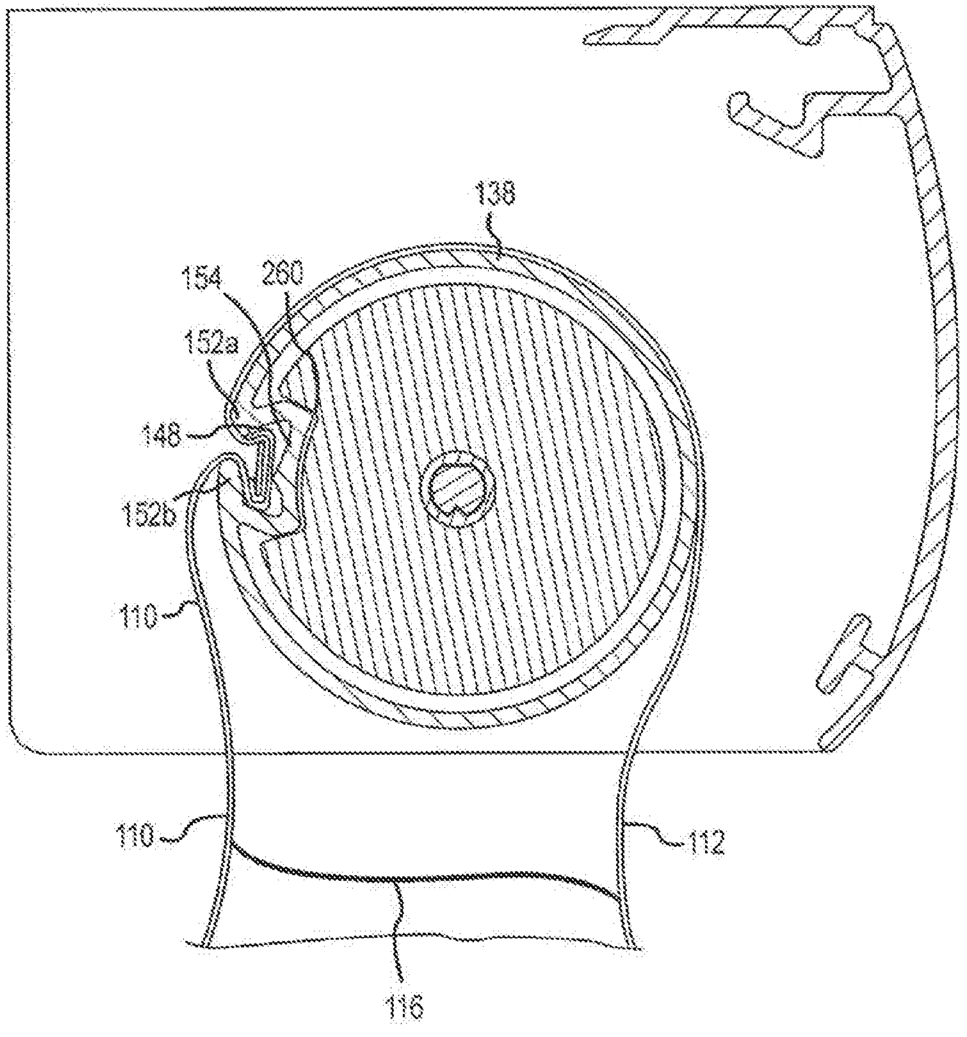
FIG. 4B is a cross-section view of the retractable shade of FIG. 1 taken along line 4B-4B in FIG. 1.
Figure 4C:
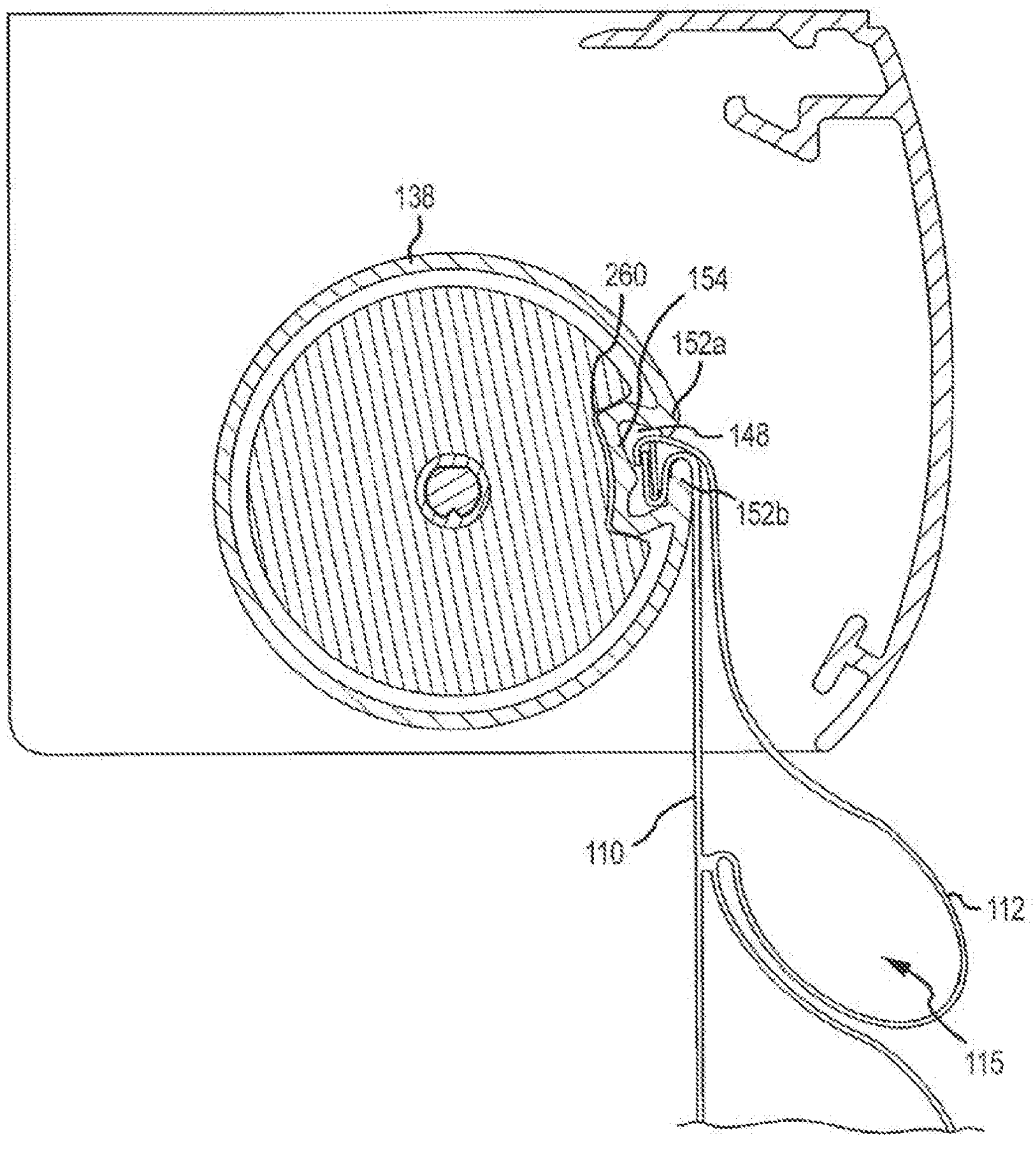
FIG. 4C is a cross-section view of a retractable shade that unwraps from a front side of the roller.

It should be noted that although the shade 102 has been illustrated and discussed as having operable vanes, many other types of coverings are envisioned to be used with the locking system discussed in more detail below. For example, FIG. 4C illustrates a cellular shade, such as a Roman shade. The orientation of the positioning lock, as well as the shade as it attaches to the roller may be varied based on the type of shade and unwinding direction. In particular, in FIGS. 4A and 4B, the shade may unwind from a rear side of the roller, whereas in FIG. 4C the shade may unwind from a front side of the roller. Substantially any type of roller support retractable covering may incorporate the locking system and other features of the present disclosure. For example, a covering including only a single sheet or multiple sheets may be used. Accordingly, the discussion of any particular embodiment is meant to be illustrative only.

The rear sheet 110 may have a top end 122 and be a backing or support sheet for the front sheet 112. The front sheet 112 may have a top end 124 and include one or more vanes 116 that may be operably connected to the rear sheet 110 at discrete locations. For example, as shown in FIGS. 1 and 2, the vanes 116 may be operably connected to the rear sheet 110. The vanes 116 may span between the first sheet and the second sheet and may be opened (as shown in FIG. 1) or closed (as shown in FIG. 2).

The vanes 116 may be attached to the front sheet 112 and the rear sheet 110 through a variety of fastening mechanisms, such as, but not limited to, adhesive, stitching, hook and loop, connectors, or the like.

Figure 3:
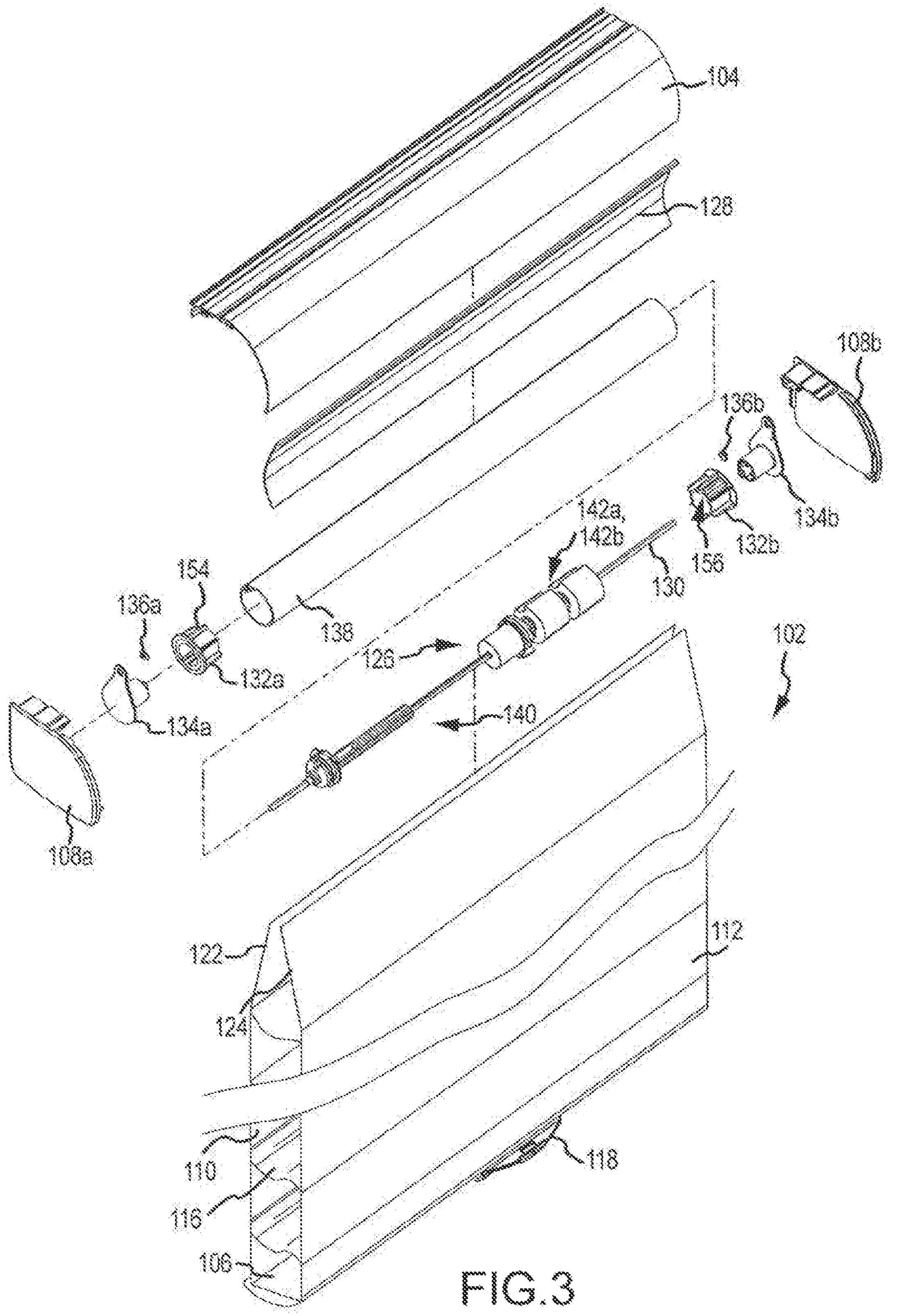
FIG. 3 is an exploded view of the retractable shade of FIG. 1.

The operating mechanism and positioning device for the covering 100 will now be discussed in more detail. FIG. 3 is an exploded view of the covering 100. FIG. 4A is a cross-section view of the covering 100 taken along line 4A-4A in FIG. 1. FIG. 4B is a cross-section view of the covering 100 taken along line 4B-4B in FIG. 1. The covering 100 may include an operating mechanism 126 including one or more retraction motors 142*a*, 142*b* and a positioning device 144. Additionally, a support assembly may include a roller 138, one or more end cap connectors 134*a*, 134*b*, one or more hubs 132*a*, 132*b*, fasteners 136*a*, 136*b*, a limit stop assembly 140, and a support rod 130. The head rail 104 may also include one or more concealing rails that may be operably connected to the backside of the head rail 104 to conceal the internal components as well as provide an aesthetically pleasing component for the covering 100 by concealing the internal components from view.

The roller 138 may be an elongated cylinder or tube and may extend through a length of the head rail 104 and may define a roller cavity 150 along an entire length of the roller 138. With reference to FIGS. 3 and 4A, the roller 138 may include a retaining pocket 148 that may from a groove that extends longitudinally along a length of the roller 138. An entrance to the retaining pocket 148 may be bounded on either side by a pair of pocket lips 152*a*, 152*b* that reduce the diameter of the entrance to the retaining pocket 148.

The support rod 130 may be operably connected to the end caps 108*a*, 108*b* through the end cap connectors 134*a*, 134*b*. The support rod 130 may be a generally elongated rod and may include one or more keying features 146 that may be used to securely connect one or more components of the motors 142*a*, 142*b* and/or the positioning device 144 thereto. With reference to FIG. 4A, one keying feature 146 may be a triangularly shaped groove that extends longitudinally along a length or a portion of the length of the support rod 130 and a second keying feature may be a planar side formed along one side of the generally cylindrically support rod 130.

The two hubs 132*a*, 132*b* may be cylindrically shaped components having one or more roller ridges 154. The roller ridges 154 may extend from an outer surface of the hubs 132*a*, 132*b* and may be configured to engage with the roller 138. Each of the hubs 132*a*, 132*b* may also include a connector recess 156 defined therethrough that may receive a portion of the end cap connector 134*a*, 134*b* and/or support rod 130.

The limit stop assembly 140 assembly may include a threaded coupling and a disk. These components may be used as stop limits for top and bottom of the shade. These components are described in related Patent Cooperation Treaty Application No. PCT/US2013/032224 entitled "Covering for an Architectural Opening," and incorporated by reference herein in its entirety.

Retraction Motors

Figure 5:
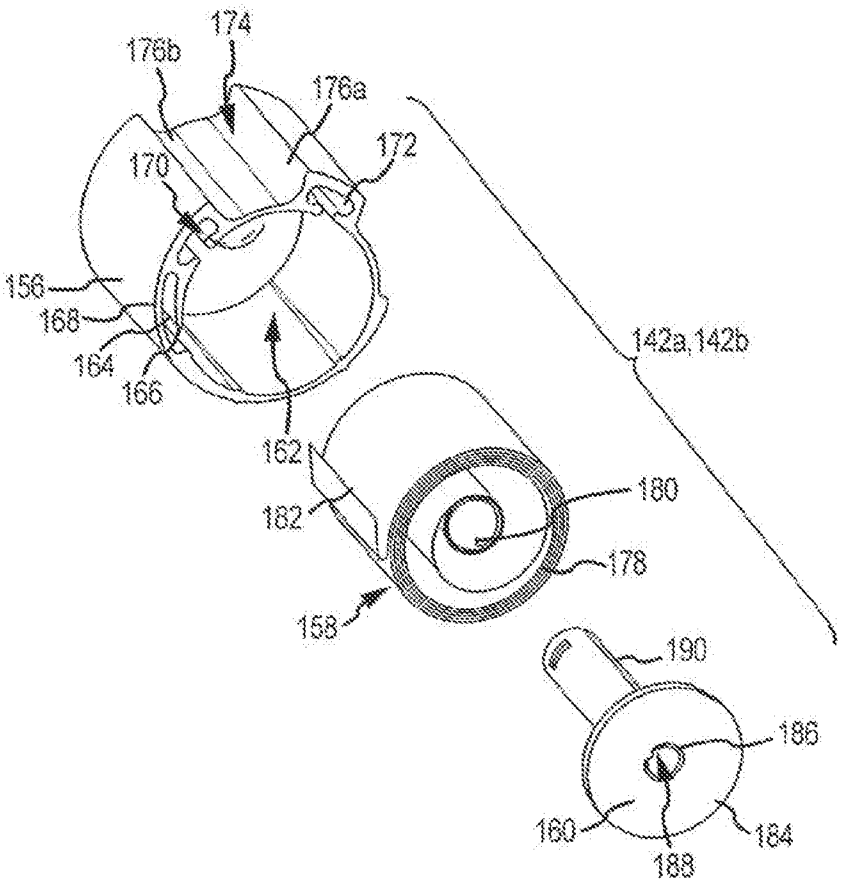
FIG. 5 is an exploded view of a retraction motor for the retractable shade of FIG. 1.

The retraction motors 142*a*, 142*b* will now be discussed in more detail. FIG. 5 is an exploded view of one of the retraction motors 142*a*, 142. The two retraction motors 142*a*, 142*b* may be substantially identical to each other; accordingly the discussion with respect to the first retraction motor 142*a* may be applied to the second retraction motor 142*b*. However, it should be noted that in other embodiments, the retraction motors might be configured differently from each other. Additionally, although two retraction motors 142*a*, 142*b* are illustrated in FIG. 4, in some implementations, the covering 100 may include a single retraction motor 142*a*, 142*b* or more than two retraction motors 142*a*, 142*b*. The number and/or size of the retraction motors 142*a*, 142*b* may be based, at least in part, on the length and width of the shade 102 or the weight of the shade 102. The retraction motors 142*a*, 142*b* may also include other mechanisms for retracting a shade, such as other types of springs, an electric motor, or the like.

The retraction motors 142*a*, 142*b* may include an outer housing or shell 156 having a generally cylindrical body having an open first end and a closed second end. The shell 156 defines a spring cavity 162 that receives the spring 158 and a portion of the arbor 160. The second end of the shell 156 may include an aperture (not shown) for receiving a terminal end of the arbor 160. The shell 156 may also include a tab crevice 164 defined between a sidewall 166 of the spring cavity 162 and an outer wall 168 of the shell 156. An end of the sidewall 166 is sharply "V" or triangular shaped. Pockets 170, 172 may be defined in the outer wall 168 of the shell 156. The pockets 170, 172 are circumferentially spaced from one another, and may be used to operably connect a different example of the spring 158 or may be used to reduce the weight of the shell 156.

A roller-engagement groove 174 may be defined in the outer surface of the shell 156. The roller-engagement groove 174 may be a recessed portion of the shell 156 that may be bordered by two sidewalls 176*a*, 176*b* on opposite sides. The roller-engagement groove 174 extends axially along the length of the shell 156 and may have a width that in general corresponds with a width of a bottom surface of the retaining pocket 148 on the roller 138. Other portions of the shell 156 may intentionally or incidentally engage interior surface of roller 138, or the shell 156 may be positioned in a spacer or adapter to allow it to fit inside a roller having a larger diameter.

The retraction motors 142*a*, 142*b* may also include the flat spring 158. The flat spring 158 for use in this example of the retraction motors 142*a*, 142*b* is a flat strip of material, typically metal, that is wound around itself in a coil, such as a clock spring. The spring 158 stores mechanical energy when wound more tightly in the direction of the coil, and exerts a force or torque in a direction opposite to a direction of the winding. The exerted force may generally be proportional to the amount of winding. The spring 158 may include a core of windings 178 having an inner tab 180 and an outer tab 182. In at least one example, the outer tab 182 is the actuable end (in combination with the shell 156), and the inner tab 180 is the fixed or anchored tab (in combination with the arbor 160 as described below). The actuable tab 182 is operably associated with and rotates together with the roller 138 during use, which winds or unwinds the spring 158. The anchor or fixed tab 180 is operably associated with and is fixed in position to not move with the roller. The relative motion between the two ends during the extension of the shade creates a spring force used to counterbalance the weight of the shade and bias the shade in the retracting direction.

Between the two tabs 180, 182, the spring 158 may have a plurality of coiled windings 178. The number of windings 178 may be varied, as well as the diameter of each of the windings 178. For example, as the outer tab 182 is moved (and the inner tab is held in a fixed position) in the direction to create more coils that are tighter and more tightly spaced, the biasing force of the spring increases. Where the outer tab 182 is moved in a direction to create fewer, less tightly spaced coils, the biasing force of the spring decreases.

The spring 158 is wrapped around the arbor 160 and together they are positioned inside the shell 156. The arbor 160 may include an arbor end plate 184 extending from a first end of an elongated arbor body 350. The arbor body 350 is received and positioned in the spring cavity 162 and extends through an exit aperture (not shown) defined in the shell 156. The arbor end plate 184 may serve as an end cap for the spring cavity 162 to prevent the spring 158 from leaving the cavity 162.

The arbor 160 may be a generally cylindrical body with a rod cavity defined there through. A locking protrusion 186 may be defined on an internal wall surrounding the rod cavity 188. The locking protrusion 186 may be a triangular protrusion. A spring recess 346 may be defined on an outer surface of the arbor 160 and may be used to operably connect the spring 158 to the arbor 160. In some embodiments, the spring recess 190 may have a length generally corresponding to a width of the spring 158, and thus may be varied based on the width of the spring. However, in some embodiments it may be desirable for the spring recess 190 to have a longer length than a width of the spring 158. In these embodiments, the spring 158 may slide along the length of the spring recess 190, which may provide additional flexibility for torsion forces, and may cushion torsion forces that could otherwise disengage the spring 158 with the arbor 160. For example, in instances where the spring is back-wound while in an un-tensioned configuration, the diameter of the windings may increase, but due to the sliding and releasable engagement of the spring with the spring recess, the tab received into the recess may release, preventing the spring from bending backwards and deforming. If the bent inner end of the spring deforms, it may not re-engage with the spring recess 190 and the spring would need be removed from the housing to repair the inner end of the spring.

With reference to FIGS. 4 A and 5, the arbor 160 and the spring 158 may be operably connected together and then positioned within the spring cavity 162 and operably connected to the shell 156. The inner tab 180 of the spring 158 may be received into the spring groove 190 defined in the arbor 160. The elongated portion of the arbor 160 may then be received within a center of the core 178 of the spring 158 and extend there through. The spring 158 and arbor 160 may then be received into the spring cavity 162. The outer tab 182 of the spring 158 may be positioned within the tab pocket 164 defined between the outer wall 168 of the shell 156 and the cavity sidewall 166. Thus, the spring 158 may be operably connected to both the arbor 160 and the shell 156. The end of the arbor 160 may then be received through an exit aperture (not shown) defined on an end wall of the shell 156.

Once assembled, the retraction motors 142*a*, 142*b* may be operably connected to the support rod 130 and the roller 138. With reference to FIGS. 3-5, the support rod 130 may be received through the rod cavity 188 defined in the arbor 166 and the locking protrusion 186 is received within the recessed keying feature 146 of the support rod 13, the planar keying feature of the support rod may engage with a flattened sidewall of the rod cavity 188. The keyed connection between the arbor 160 and the support rod 130 may prevent the arbor 160 from rotating relative to the support rod 130.

The retraction motor 142*a*, 142*b* may then be received into the roller cavity 150 of the roller 138. The roller engagement feature 174 may receive the ridge 154 with the shell sidewalls 176*a*, 176*b* interfacing with the outer sidewalls of roller engagement feature 174. The engagement between the roller engagement feature 174 and the roller ridge 154 may rotatably connect the retraction motors 142*b* to the roller 138, such that the retraction motors 142*a*, 142*b* may rotate as the roller 138 rotates.

Positioning Device

The positioning device 144 or locking assembly will now be discussed in more detail. Initially, it should be noted that the orientation of the positioning device 144 in the shade and with respect to the support rod and roller may be varied based on the desired direction of rotation for winding and unwinding the shade. For example, FIG. 4B illustrates the positioning device being used with a shade that unwinds from a rear side of the roller with the positioning device 144 having a first orientation and FIG. 4C illustrates the positioning device 144 being used with a shade that unwinds from a front side of the roller with the positioning lock having a second orientation that is reversed from the example shown in FIG. 4B. Generally, the orientation of the positioning device 144 may be varied based on the desired rotation direction to retract and extend the shade. Accordingly, the discussion of any particular implementation is meant as exemplary only.

Figure 6A:
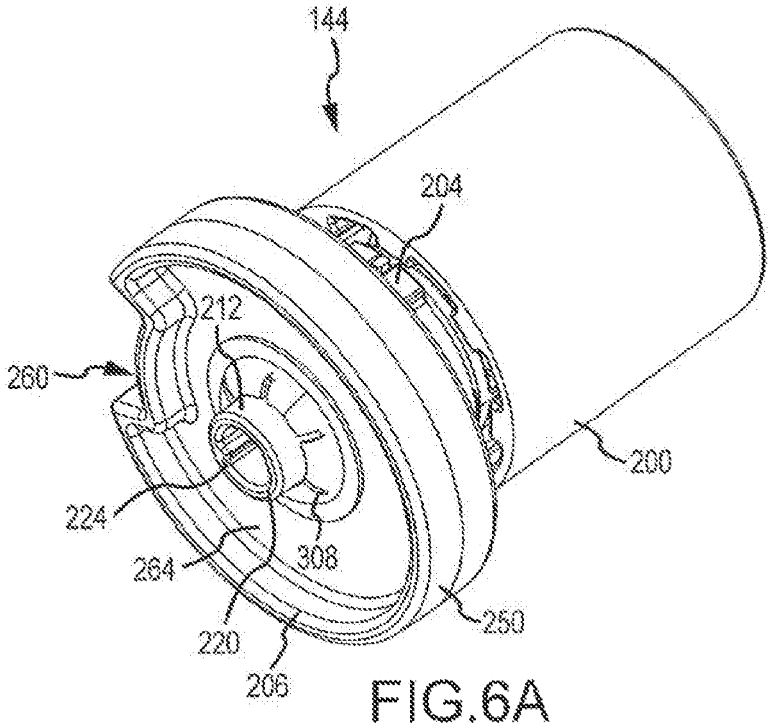
FIG. 6A is a front isometric view of a positioning device for the retractable shade.
Figure 6B:
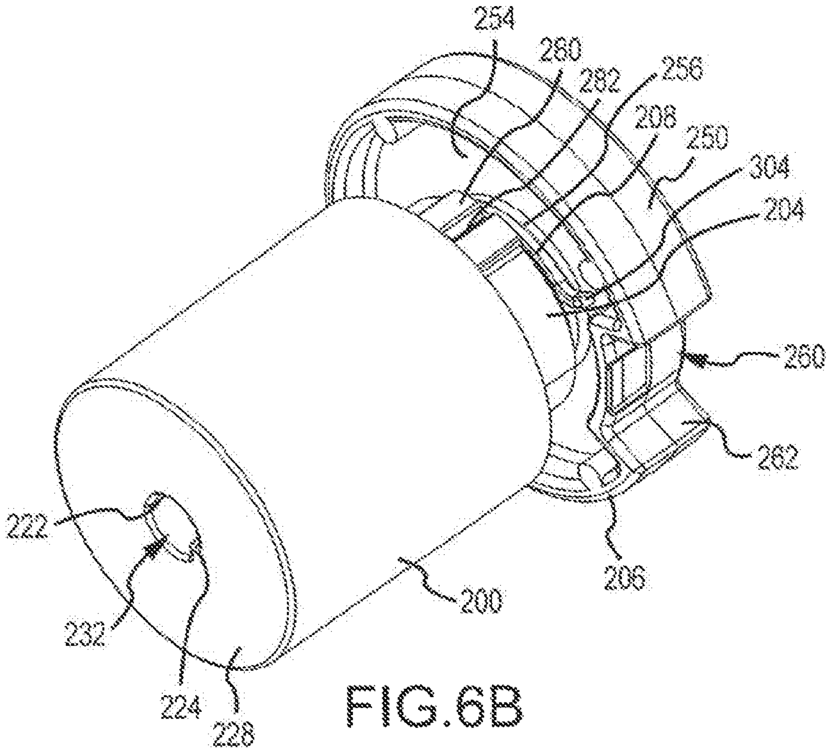
FIG. 6B is a rear isometric view of the positioning device of FIG. 6B.
Figure 7:
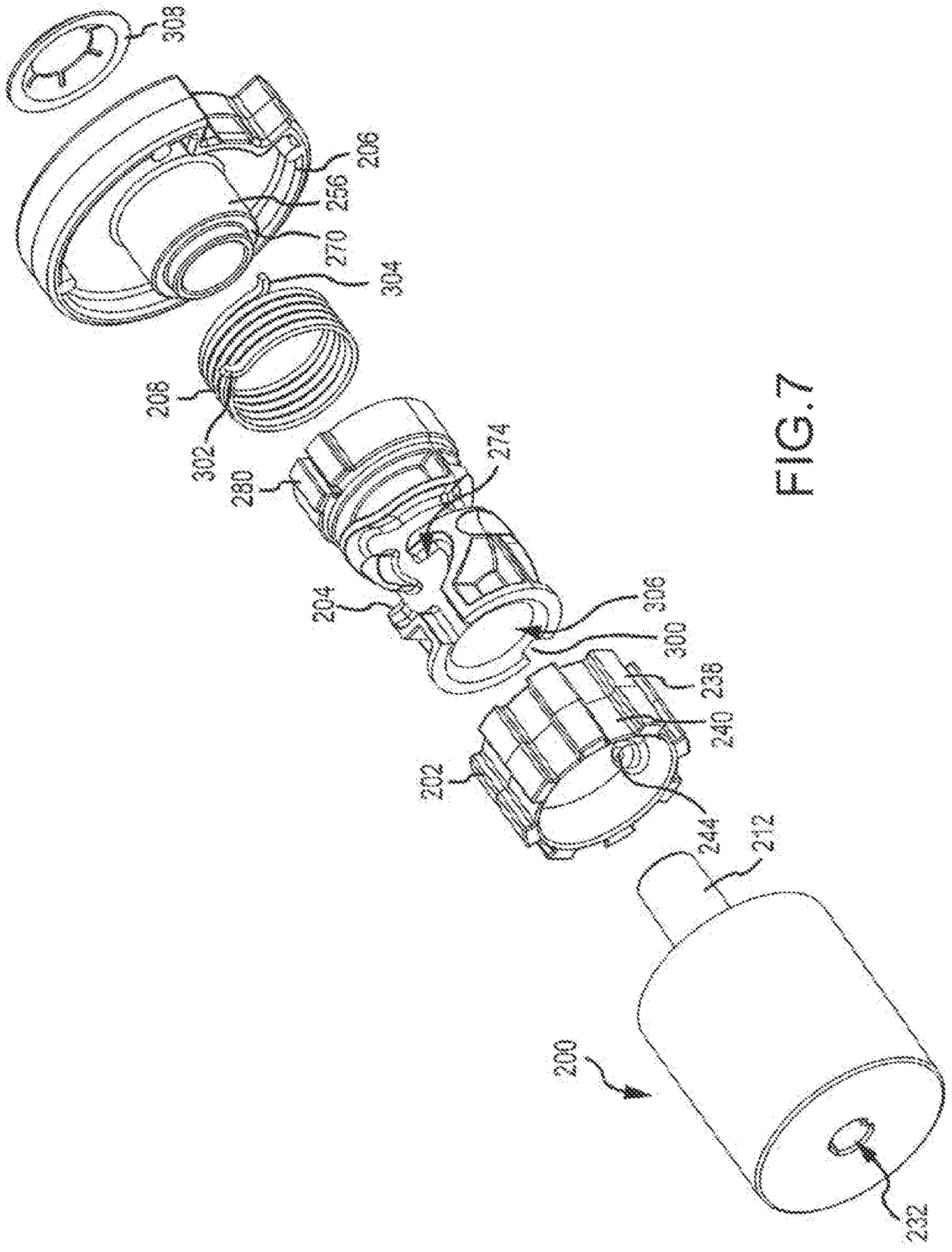
FIG. 7 is an exploded view of the positioning device of FIG. 6A.

FIG. 6A is a front perspective view of the positioning device 144. FIG. 6B is a rear perspective view of the positioning device 144. FIG. 7 is an exploded view of the positioning device 144. The positioning device 144 may include a retainer housing 200, a shuttle 202, a spool 204, an engagement disk 206, and a clutch spring 208, each of which will be discussed in turn.

Figure 8A:
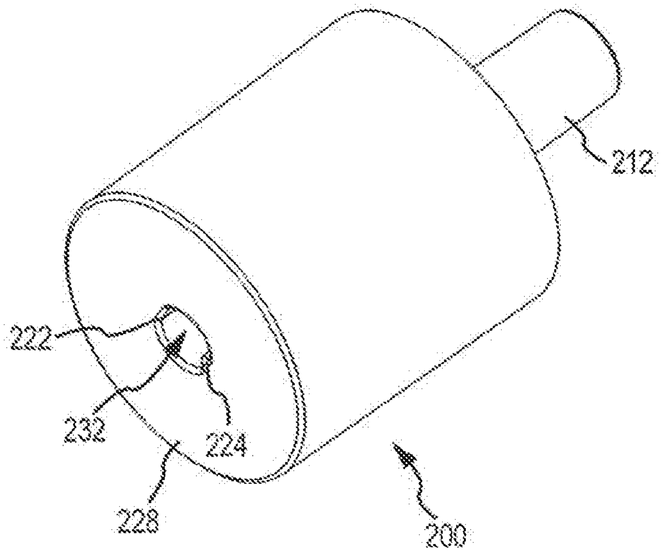
FIG. 8A is a rear isometric view of a retainer of the positioning device.
Figure 8B:
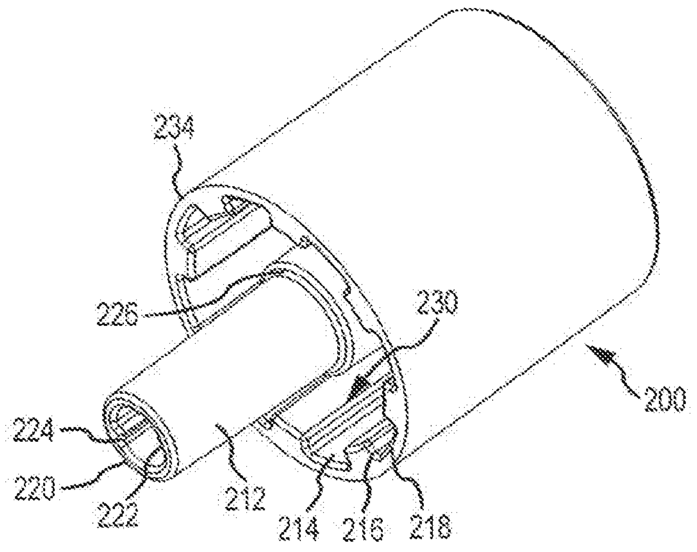
FIG. 8B is a front isometric view of the retainer.

The retainer housing 200 may enclose shuttle 202 and spool 204. FIGS. 8A and 8B illustrate various perspective views of the retainer housing 200. The retainer housing 200 may be a generally cylindrical body defining a retainer cavity 230. The retainer cavity 230 may include a keyed surface that may include guide ridges 216 and guide grooves 214 defined on an interior surface of the retainer housing 200. The guide grooves 214 and guide ridge 216 may each extend longitudinally along a length of the retainer housing 200. The guide ridges 216 may be spaced apart from each other to define the guide grooves 214 and guide edges 218 or sidewalls. The guide edges 218 are positioned at the interface of the guide grooves 214 and the guide ridges 216. In some examples, the guide edges 218 may be angled such that the guide ridges 216 may have a generally trapezoidal shape in cross-section.

Continuing with FIGS. 8A and 8B, a retainer axle 212 may extend from distal end 228 of the retainer housing 200. The retainer axle 212 may extend from distal end 228 past an outer edge 234 of the retainer housing 200. Accordingly, a proximal end 220 may be defined outside of the retainer housing 200 and a length of the retainer housing 200 may be defined from the proximal end 220 of the retainer 212 to the distal end 228 of the retainer housing 200.

A rod cavity 232 may be defined through a center of the retainer axle 212. The retainer axle 212 may have a generally cylindrical shape. In some examples, a lip 226 may be defined on an outer surface of the retainer axle 212 before the retainer axle exits the retainer housing 200.

The interior surfaces defining the rod cavity 232 may be keyed or otherwise configured to engage with the support rod 130. For example, a protrusion 224 and a planar engagement surface 222 may extend along a length of the rod cavity 232. The protrusion 224 may be triangular shaped and may be positioned on an opposite side of the rod cavity 232 from the engagement surface 222. The protrusion 224 and the planar engagement surface 222 fittingly engage with the corresponding features of the support rod 130 as described below.

Figure 9A:
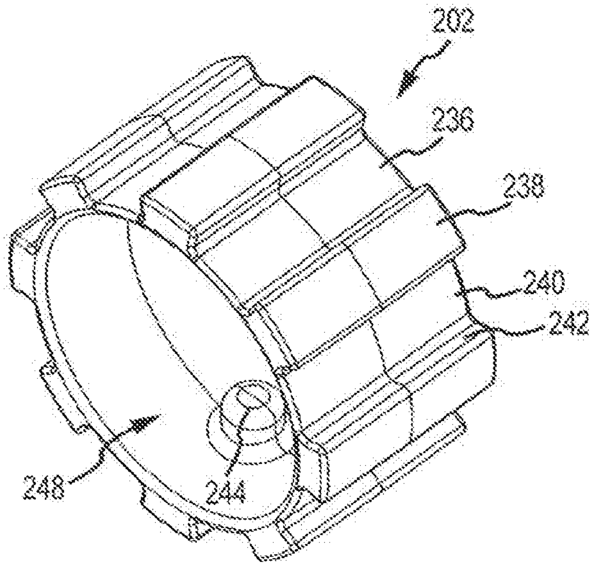
FIG. 9A is an isometric view of a shuttle of the positioning device.
Figure 9B:
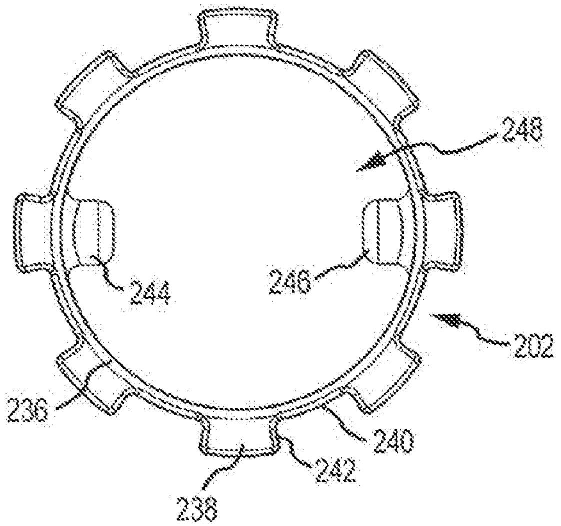
FIG. 9B is a front elevation view of the shuttle.

The shuttle 202 may be received in the retainer cavity 230. FIG. 9A is a perspective view of the shuttle 202. FIG. 9B is a front elevation view of the shuttle 202. The shuttle 202 may include a shuttle body 236 which may be a hollow cylinder member. A plurality of translation features 238 may be defined an outer surface of the shuttle body 236 with a plurality of receiving grooves 240 defined there between. Translation features 240 and the receiving grooves 240 may extend longitudinally along a length of the shuttle 202. The translation features 238 and receiving grooves 240 may correspond to the guide ridges 216 and guide grooves 214 defined on the interior of the retainer housing 200. Translation walls 242 may define the interface between each receiving groove 240 and each translation feature 238. The translation walls 242 may extend at an angle from the outer surface of the shuttle body 236 to define a trapezoidal shape for the translation feature 238.

The shuttle body 236 defines a spool aperture 248. The spool aperture 248 may have a diameter sized such that the walls of the shuttle body 236 may be relatively thin. Two or more pins 244, 246 may be defined on an interior of the shuttle body 236 and may extend radially into the spool aperture 248. Each of the pins 244, 246 may have a rounded end that may engage with the spool 204 and travel along an outer surface thereof. The pins 244, 246 may be in diametrically opposed positions within the spool aperture 248, which as described below, may allow each pin 244, 246 to interact with an opposite side of the spool 204 and facilitate smooth operation of the positioning device.

Figure 10A:
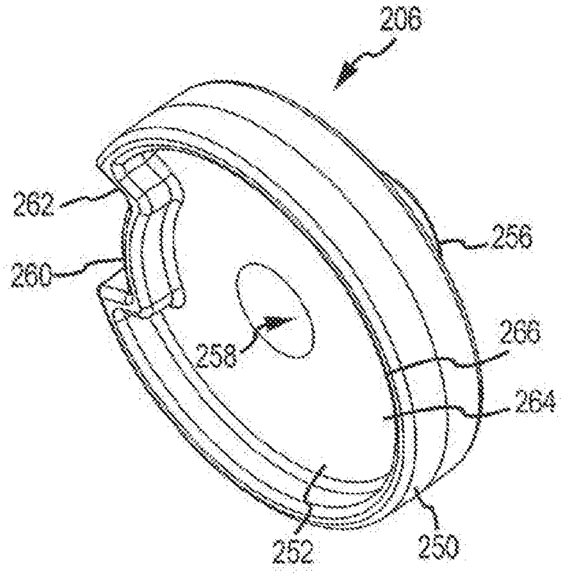
FIG. 10A is a front isometric view of an engagement disk of the positioning device.
Figure 10B:
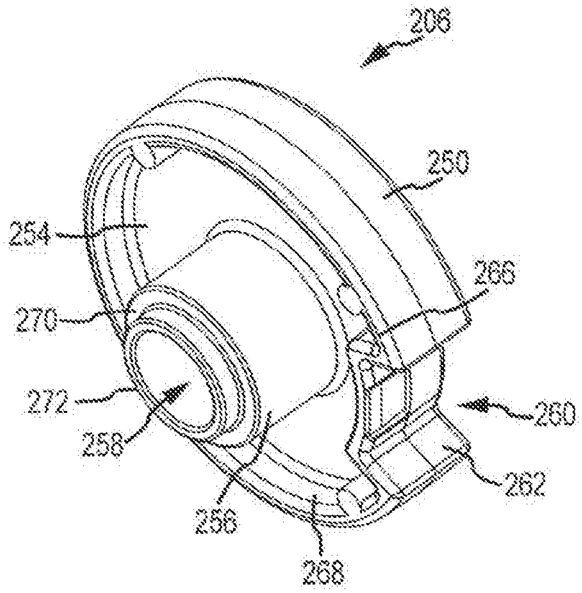
FIG. 10B is a rear isometric view of the engagement disk.

Referring to FIGS. 10A and 10B, the engagement disk 206 may be operably connected to the retainer housing 200 and the spool 204. The engagement disk 206 may form one end of the positioning device 144. The engagement disk 206 may include a rim 250 that axially extends circumferentially around a disk body 264. The rim 250 forms an annular space around the disk body 264, such that the disk body 264 may be recessed from the outer edges of the rim 250.

A key 260 may be defied on the outer surface of the rim 250, the roller recess 269 may define a trapezoidal groove which receives a corresponding feature on the roller to key the disk and the roller to rotate as one. Engagement walls 262 may abut either side of the roller recess 269 and may define the trapezoidal shape of the recess 269. Additionally, in some examples, the engagement walls 262 may extend past a bottom surface of the rim 250 towards a center of the engagement disk 206. In these examples, the disk body 264 may be generally circularly shaped but have a trapezoidal recess that receives the engagement walls 262. The key 260 may also extend past the bottom surface 268 of the rim 250 towards the center of the engagement disk 206. The key shape allows the disk to slide along the roller axially while maintaining a rotation key.

The disk body 264 may include a web 252 defining a central aperture 258 through a center thereof. A boss 256 may extend outwards from a second side 254 of the engagement disk 206. The boss 256 may be a tube or hollow cylinder and may extend past the outer edge 266 of the rim 250. In some instances, the boss 256 may define a step 270 towards a distal end thereof. The step 270 may transition to a boss extension 272 that extends from the step 270. The boss extension 272 may have a smaller outer diameter than the boss 256 and the step 270. The retainer aperture 258 may be defined through the boss 256, the boss extension 272, as well as the disk body 264.

Figure 11A:
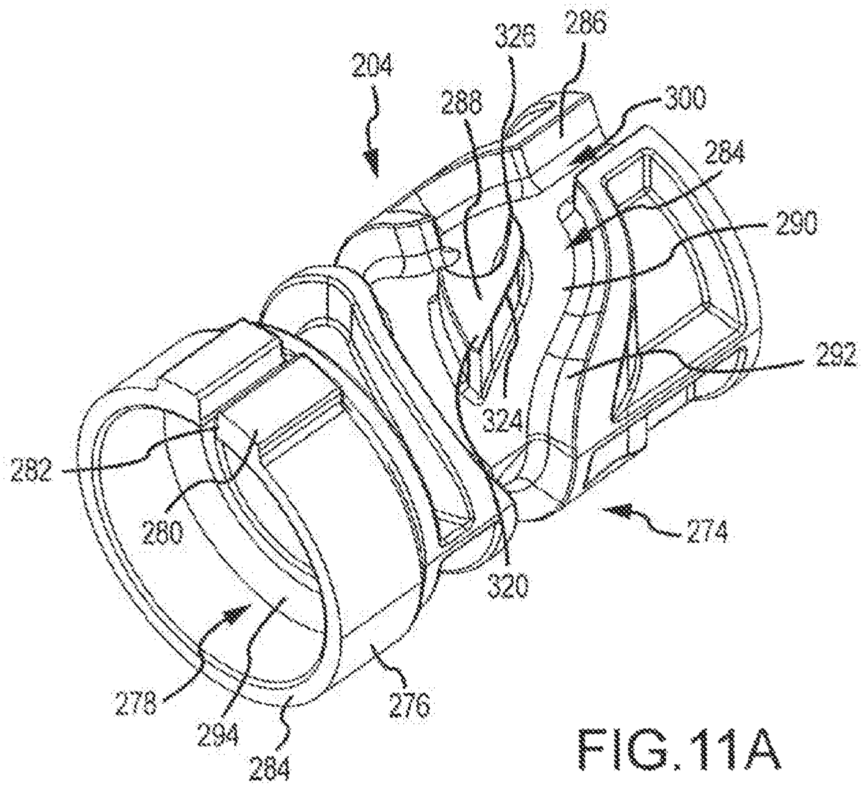
FIG. 11A is a front isometric view of a spool of the positioning device.
Figure 11B:
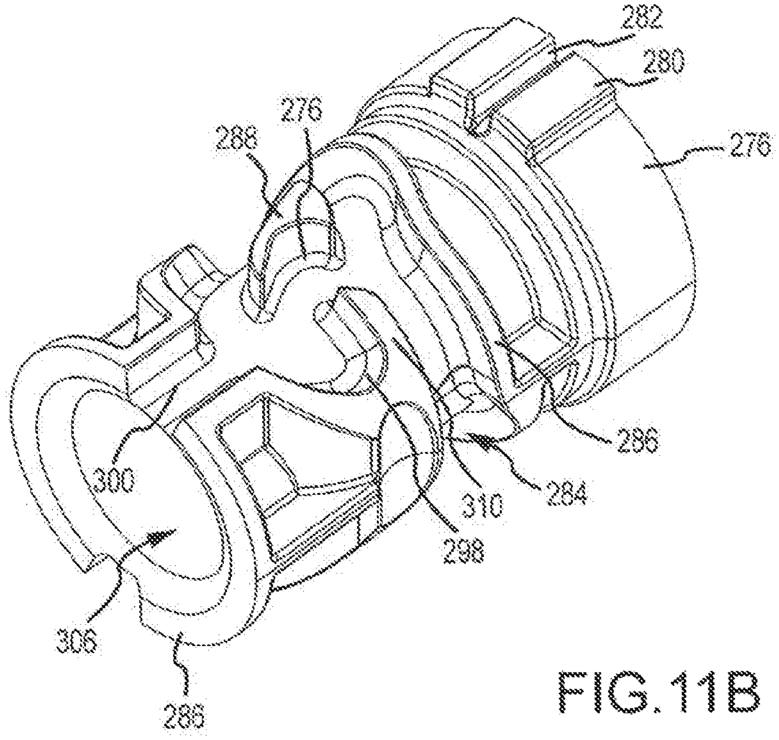
FIG. 11B is a rear isometric view of the spool.
Figure 12A:
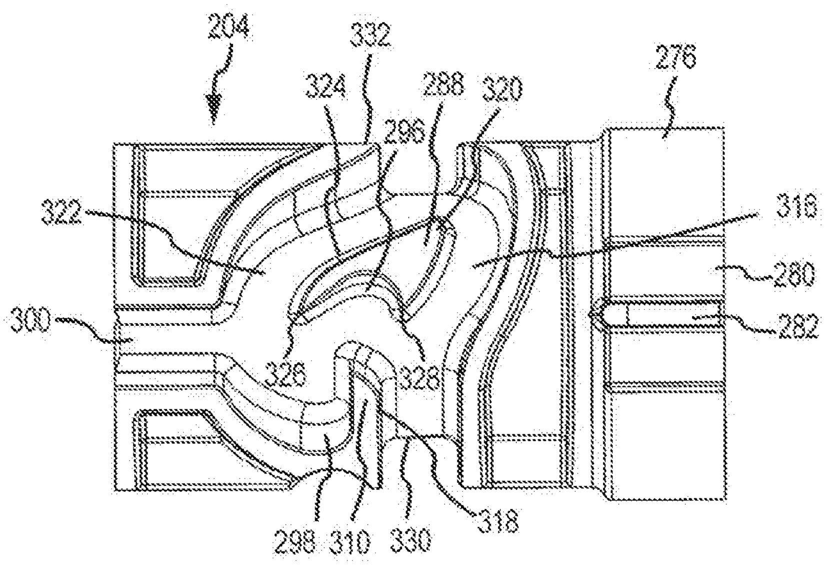
FIG. 12A is a top plan view of the spool.
Figure 12B:
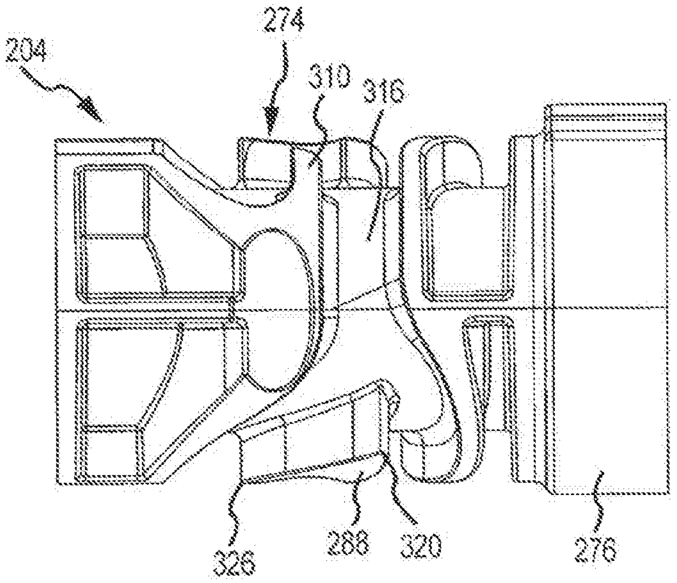
FIG. 12B is a side elevation view of the spool.

The spool 204 will now be discussed in more detail. FIG. 11A is a front perspective view of the spool 204. FIG. 11B is a rear perspective view of the spool 204. FIG. 12A is a top elevation view of the spool. FIG. 12B is a side elevation view of the spool. With reference to FIGS. 11A-12B, the spool 204 may be a generally cylindrical shaped member having a pin engagement surface 274 defined on an outer surface thereof and an axle aperture 278 may be defined therethrough. The axle aperture 278 may extend through a length of the spool 204, such that the spool 204 may be received on the retainer axle 212.

A spool collar 276 may be defined on a first end 284 of the spool 204 and may extend radially outwardly from the pin engagement surface 274. The spool collar 276 may include a spring slot 282 defined through a portion thereof. In some examples, the spring slot 282 may be a horizontal slit defined through the spool collar 276, the spring slot 282 may be in communication with the axle aperture 278. The spool collar 276 may include a pair of collar clamp walls 280 that abut either side of the spring slot 282. The collar clamp walls 280 may be elevated from the outer surface of the spool collar 276. As described in more detail below, the collar clamp walls 280 help to retain a tab of the spring there between.

A spring seat 294 may be recessed from the first outer end 284 of the spool 204 and be positioned within the axle aperture 278. The spring seat 294 may define a shelf within the axle aperture 278. The axle aperture 278 may extend through the spring seat 294, but may reduce in diameter as it extends through the spring seat 294.

The pin engagement surface 274 defines a plurality of channels 284 having contoured channel walls 286 that define a plurality of pathways 290. The contoured channel walls 286 may also form one or more engagement features on the pin engagement surface. The channel walls 286 and engagement features interact with pins on the spool. Additionally, because the pins on the spool are diametrically opposed, the pathways 290 may be symmetrically around the spool.

The pin engagement surface 274 may also include one or more directing islands 288 or engagement features, which similarly help to define channels 284. The directing island 288 may be spaced apart from the outer channel walls and may be positioned within one or more pathways 290. In some examples, the island 288 may be positioned in a center of each side of the spool 204. The directing island 288 may be shaped as an acute triangle having rounded edges and a recess defined on a bottom edge. With reference to FIG. 12A, the directing island may a peak that is angled towards the spool collar 276 that defines a locking diversion tip 320. A contoured sidewall 324 extends from a left side of the locking diversion tip and is angled towards the entry channel 300, the contoured sidewall 324 may terminate at a seat diversion tip 326. From the seat diversion tip 326, the directing island 288 transitions upwards towards the locking diversion tip 320 to define the curved recess forming the upper seat 296. From the upper seat 296, the directing island 288 may curve back down towards the release diversion tip 310 with the third corner defining a main pathway tip 328. The different pathways will be discussed in more detail below.

A main pathway 316 may be defined between the release diversion tip 310 and a vertical wall extending from a bottom edge 330 of a first side of the pin engagement surface toward a top edge 332. The main pathway 316 may extend upwards towards the top edge 332 and may extend around the locking diversion tip 320. Thus, the main pathway 316 may curve outward towards the spool collar 276 as it approaches and extends around the directing island 288. The top and bottom ends of the main pathway 316 are in communication with the bottom and top ends, respectively, of the main pathway defined on the opposite side of the spool 204. An extension pathway 322 may extend from the top of the main pathway 316 and follow the contoured sidewall 324 of the directing island 288 towards the entry pathway 300. The extension pathway 322 may generally curve downward from the top edge 332 and may generally be convexly curved towards the second end 286 of the spool 204.

With reference to FIGS. 11B and 12A, the pin engagement surface 274 may define a plurality of seats or parking positions. An upper seat 296 may be defined on a bottom wall of the directing island 288 and a lower seat 298 may be defined on a channel wall 286 adjacent to but spaced apart from the directing island 288. The two seats 296, 298 may define curved pockets, which as discussed in more detail below, will engage with the pins on the shuttle to retain the pins within the pockets.

With reference to FIGS. 12A and 11B, an entry channel 300 may be defined on a second end 286 of the spool 204. The entry channel 300 may be a recessed groove that extends to the second end 286 of the spool 204, and as will be discussed in more detail below, allows the shuttle 202 to be threaded onto the spool 204. The entry channel 300 extends to join with the other channels 284 defined on the pin engagement surface 274. The entry channel 300 may be substantially straight and may generally run longitudinally along a portion of the length of the spool 204. The entry channel 300 terminates as it approaches the operational pathways defined on the pin engagement surface 274. In some instances, the entry channel 300 may have a length that is generally about one fourth of the total length of the spool 204. However, depending on the size of the pins 244, 246, the length of the spool 204, and the dimensions of the pin engagement surface, this may be varied as desired.

It should be noted that the series of channels 284 and pathways 290 the spool 204 may be repeated on opposing sides. That is, a first side of the spool may have substantially the same pattern of channels and pathways as defined on a second side of the spool. In these examples, as the spool 204 rotates (discussed below), the pins 244, 246 may move relative to the spool and travel around the outer surface of the spool through the pathways defined in the pin engagement surface. example, with reference to FIG. 12B, the main pathway 316 may exit the first side of spool 204 and connect with the main pathway on the second side of the spool (as it extends over the sides of the spool). The two matching patterns may engages each of the pins 244, 246 of the spool 204. However, in other embodiments, the pin engagement surface 274 may have other patterns extending across the entire outer surface of the spool 204 to operate with a single pin (or may have one or more that may or may not match each other).

With reference to FIG. 7, the clutch spring 208 may be a wrap spring having two tangs, a spool tang 302 and a disk tang 304. The clutch spring 208 may include a plurality of windings between each of the tangs 302, 304. In these embodiments, the spool tang 302 and the disk tang 304 may each form one end of the clutch spring 208. The spool tang 302 may be biased or actuable by the spool.

With reference to FIGS. 6A-7, the positioning device 144 may be operably connected together by inserting the clutch spring 208 onto the boss 256 of the engagement disk 206. The disk tang 304 end of the clutch 208 may be inserted first onto the boss 256 such that the disk tang 304 may abut the second side 254 of the disk body 264. The clutch spring 208 may have a length at least somewhat shorter than a length of the boss 256 and in some examples may terminate prior to the step 270 defined on the boss 256. The spool tang 302 may extend outward substantially perpendicular to the boss 256.

Once the spring clutch 208 is received around the boss 256 of the engagement disk 206, the spool 204 may be partially received around the boss 256. The spool collar 276 may be received over the boss 256 and the spool tang 302 of the spring clutch 208 is positioned within the spring slot 282 and secured therein by the collar clamp walls 280. The spool collar 276 may be received over the spring clutch 208 and the boss 256, the spool collar 276 may have generally the same length as the boss 256 and may transition to the pin engagement surface at the step 270 and boss extension 272.

When the clutch spring 208 is held in the spring slot 282, the spool 302 may be substantially anchored by the spool 204. As discussed below, the spool 204 may be operably connected to the support rod 130, which may substantially prevent the spool 204 from rotating, and as the spool tang 302 of the clutch spring is received into the spring slot 282, the spool tang 302 may be held in position.

With reference to FIGS. 6A-7, 9B, and 11B the shuttle 202 may be threaded onto the spool 2004. The shuttle 202 may be oriented such that the first pin 244 and the second pin 246 each align with one of the entry channels 300 defined by the pin engagement surface 274. When aligned, the shuttle 202 may be slid onto the spool 204 with the pins 244, 246 sliding through the entry channel 300.

With the shuttle 202 positioned over the spool 204, the retainer housing 200 may be received over the shuttle 202 and the spool 204. With reference to FIGS. 6A, 6B, 8B, and 9B, the guide grooves 214 of the retainer housing 200 may be aligned with the translation feature 238 of the shuttle 200 and the guide ridges 216 may be aligned with the receiving grooves 240 of the shuttle 202. Once the corresponding keying features are aligned, the retainer housing 200 may be slid onto the shuttle 202 and the spool 202. It should be noted that the retainer housing 200 may have a longer length than the shuttle 202 and so the retainer housing 200 may substantially enclose the shuttle 202.

The retainer axle 212 is received through the axle passage 306 defined through a body of the spool 204. The retainer axle 202 may extend through the length of the spool 204 and into the central aperture 258 of the engagement disk 206. With reference to FIG. 6A, in some examples, the retainer axle 212 may extend through the central aperture 258 to exit the engagement disk 206. In these examples, a securing nut 308 may be positioned around the retainer axle 212 to secure it against the engagement disk 206. The distal end 228 of the retainer housing 200 may thus enclose one end of the positioning device 144 and the other end may be enclosed by the disk body 264 of the engagement disk 206. With continued reference to FIG. 6A the retainer 200 housing may terminate as the spool transitions to form the spool collar 276. In this manner, the spool collar 276 and the spool tang 302 of the clutch spring 208 may not be enclosed by the retainer housing 200.

With reference to FIGS. 3, 4B, 6A, and 6B, the operating and locking system within the roller 138 will now be discussed in more detail. Once the device 144 is assembled, the support rod 130 may be threaded through the rod 232 defined in the retainer housing 200. The support rod 130 may be aligned with rod cavity 232 such that the keying feature 146 of the support rod 130 may be with the protrusion 224 and the flat keying feature may be aligned with the surface 222 of the retainer housing 200. Once aligned, the support rod 130 may be threaded through the retainer axle 212. As described above, the retraction motors 142*a*, 142*b* may be received onto the support rod 130 in a similar manner. The limit stop assembly 140 may also be received on the support rod 130 as well.

As shown in FIG. 4B, the positioning device 144 may be oriented so as to face the second end cap 108*b*, i.e., the engagement disk 206 may be closest to the second end cap 108*b*. In this orientation, the positioning device 144 may be used in instances where a shade may unwind off of a backside of the roller. However, with reference to FIG. 4C in other implementations, the shade may be configured to unwind off a front-side of the roller. For example, some Roman shades may be configured to unwrap on a front side of the roller. In these implementations the positioning device 144 orientation may be reversed and may be oriented such that the engagement disk is closest to the first end cap 108*a*. In other words, the direction of the positioning device of the support rod may be varied based on the respective rotation directions of the roller to extend and retract the shade.

The roller 138 may then be received around the support rod 130, including the retraction motors 142*a*, 142*b* (as discussed above with respect to FIG. 4), the positioning device 144, and the limit stop assembly 140. The key 260 defined on the engagement disk 206 of the positioning device 144 is aligned with and receives the roller ridge 154 with the engagement walls 262 extending around the sidewalls of the roller ridge 154. This allows the engagement disk 206 to be keyed to the roller 138, such that as the roller 138 rotates, the engagement disk 206 may rotate correspondingly.

With the roller 138 received around the support rod 130, the support 130 may then be received through apertures defined in both hubs 132*a*, 132*b* and a corresponding cavity defined on the end cap connectors 134*a*, 134*b*. The hubs 132*a*, 132*b* may be received into the roller 138 and may be rotatably connected therewith. The end cap connectors 134*a*, 134*b* may be operably connected to either the end caps 108*a*, 108*b* through the fasteners 136*a*, 136*b*. In this manner, the support rod 130 may be secured to the end caps 108*a*, 108*b* and may be prevented from rotating. In some examples, the end cap connectors 134*a*, 134*b* may be connected to the end caps 108*a*, 108*b* using other types of fastening such as, but not limited to, adhesive, heat staking, or the like. In these examples, the plugs or fasteners 134*a*, 134*b* may be omitted.

The shade 102 may be operably connected to the roller 138, as the top ends 122, 124 of the rear and front sheets, respectively, may be operably connected into the retaining pocket 148 defined by in the roller 138 (the outer recession forming the interior roller ridge 154). For example, the top ends 122, 124 may be glued, anchored by an anchoring member (such as a rod positioned within the retaining pocket 148), or otherwise connected to the roller 138. The head rail 104 and concealing rail 128 (which may be the rail nearest the wall or other structure containing the architectural opening) may then be connected around the assembly.

In some examples, such as when the shade is long or made of a heavy material, one or more components may slide within the roller, along the support rod, or within the head rail. Accordingly, additional fastening devices, such as push nuts or the like, may be inserted onto the support rod 130 to maintain the spatial separation between the components of the positioning device 144 relative to each other (e.g., the engagement disk and the retainer) or between the positioning device and other components of the shade. Other fasteners may also be used as desired or required.

Operation of the Covering

In discussing the operation of covering 100, it should be noted that the retainer housing 200 is keyed to the support rod 130 and is stationary, even as the roller rotates. The engagement disk 206 is keyed to the roller 138 and rotates with roller 138, except when the positioning device is in a locked position and the engagement disk 206 prevents rotation of the roller. The shuttle 202 does not rotate but travels laterally along the spool 204, which rotates due to its connection to the engagement disk 206 (via the clutch 208). The shuttle 202 engages the spool 204 through the pins 244 and due to the longitudinal grooves in the retainer housing 200, traces along the surface of the spool 204. In other words, the pathways on the spool 204, as well as grooves and ridges on the retainer housing 200 and the shuttle 202, direct the motion of the shuttle 202 to translate laterally across the surface of the 204, as the spool 204 rotates beneath. Thus, the shuttle 202 does not move rotationally, but the spool moves underneath the shuttle 202 and the shuttle 202 translates across a length of the spool. Additionally, the pins 244, 246 on the shuttle are diametrically opposed and so the discussion of the movement of one of the pins equally applicable to the other pin. Therefore, the below discussion is made with respect to the first pin but is mean to encompass movement of the second pin.

Figures 13A, 13B, 13C, 13D:
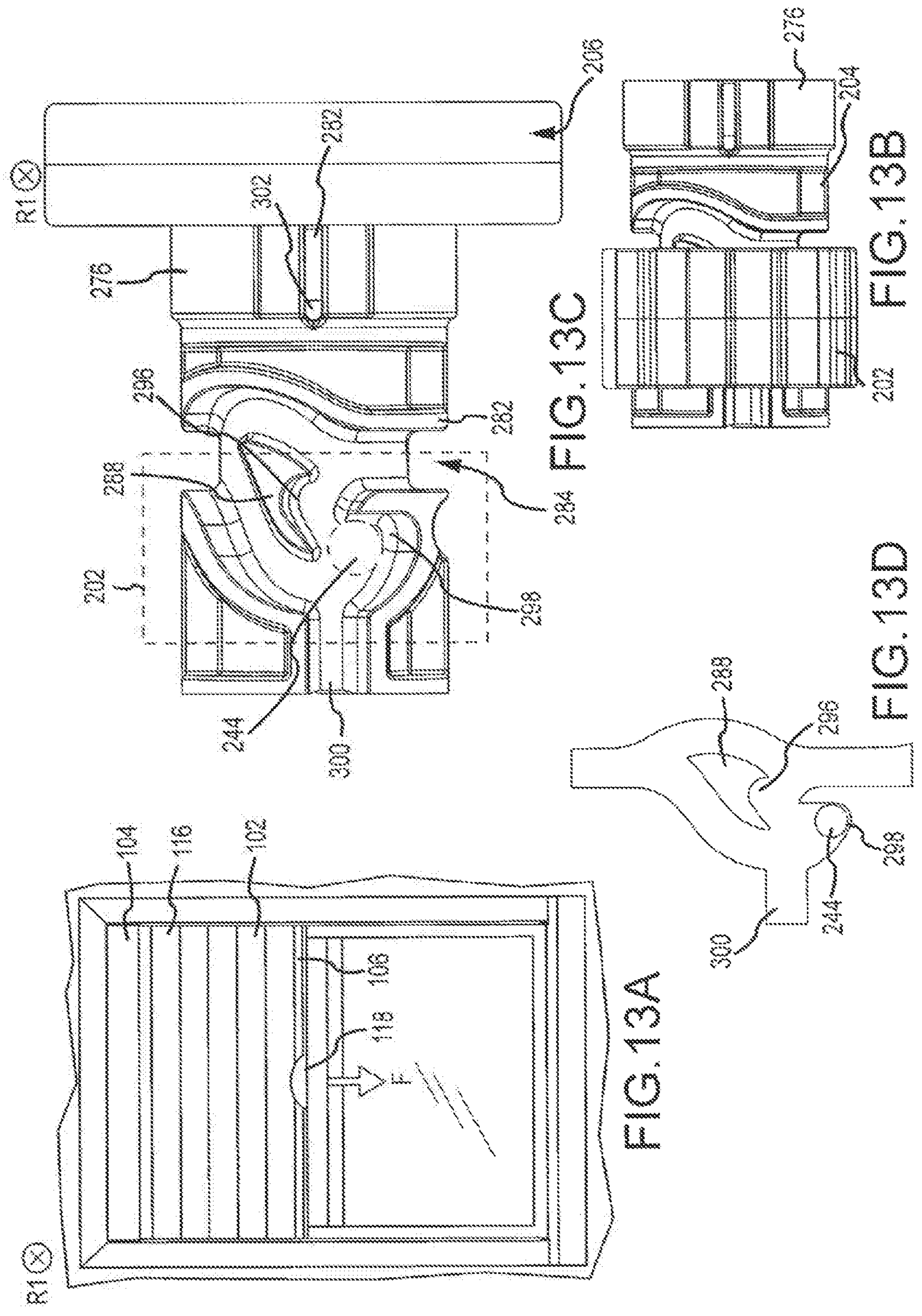
FIG. 13A is a front perspective view of the retractable shade being extended.
FIG. 13B is a side elevation view of the shuttle position on the spool when the shade is being extended.
FIG. 13C illustrates the same view as FIG. 13B but with the shuttle shown in phantom to illustrate the position of the shuttle pins on the spool.
FIG. 13D is a simplified schematic view of the one half of the pin engagement surface illustrating the position of the shuttle pin when the shade is extending.

Extension of the shade is described with respect to FIGS. 13A-13D. FIG. 13A is a front perspective view of the shade 102 being extended. FIG. 13B is a side elevation view of the shuttle positioned on the spool for axial motion relative thereto when the shade is extending corresponding to FIG. 13A. FIG. 13C illustrates the same view as FIG. 13B but with the shuttle shown in phantom to illustrate the position of the pins 244, 246. FIG. 13D is a simplified schematic view of the one half of the pin engagement surface illustrating the position of the shuttle pin when the shade is extending. With reference to FIGS. 13A-13D, a force F may be applied to the end rail 106 (such as a user pulling down on the grip 118), which causes the roller 138 to rotate in a first direction R1. In other words, the force F may pull the shade 102, rotating the roller to cause the shade 102 to unwind off the back of the roller 138. The clutch spring 208 may be disengaged and not completely inhibiting relative motion (e.g. "open") while the extension force F is applied, which allows the spool 204 to rotate, but provides some frictional force against the rotation. Further, as the pin 244 of the shuttle 204 interacts with the outer surface of the spool 204, the user experiences some frictional force as the shade is extended.

As shown in FIGS. 13A-13D, in some instances, the roller 138 may rotate backwards towards the concealing rail 128 as the shade 102 is extended. As the roller 138 rotates, the shade 102 unwinds of the back of the roller 138 and lowers. In some examples, such as the covering 100 illustrated in FIGS. 13A-13D, the shade 102 will unwind such that it may extend or drop off of a backside of the roller 138 (e.g. the side of the roller closer to the architectural opening). Additionally, in embodiments where the shade 102 includes the vanes 116, as the shade 102 rolls off of the roller 138, the elements 120 of the vanes 116 may cause the vanes 116 to extend into their open configuration (e.g., the configuration illustrated in FIG. 1A). Because the engagement disk is keyed to the roller, when the clutch is open such as shown in FIGS. 13A-13D, the engagement disk rotates in the first rotation direction R1.

With brief reference to FIG. 4, the retraction motors 142*a*, 142*b*, and specifically, the shells 156 of each of the retraction motors 142*a*, 142*b*, are coupled to the roller 138 through the roller engagement groove 174. Thus, as the roller 138 rotates in the first rotation direction R1 (illustrated in FIG. 13A as rotating into the shells 156 rotate in the same direction. As the shells 156 rotate in the first direction R1, the outer tab 182 of the flat spring 158 is rotated as well. Because the inner tab 180 of the flat spring 158 is anchored on the arbor 160, which is keyed to support rod 130, the inner tab 180 does not rotate. Thus, the outer tab 182 may be wound around the core 178 to tighten the spring. This causes the retraction motors 142*a*, 142*b* to increase the biasing force that can be exerted by the spring correspondingly with the extension of the shade 102. In this manner, the retraction motor may increase its potential retraction force to counteract the increasing weight of the shade (due to gravity) as the shade is unrolled from the roller 138. It should be noted that although the retraction motors may vary the biasing force as the shade is extended, in other embodiments, the retraction motors may a have set biasing force that does not vary with the length of the shade. In these instances the biasing force of the flat spring may be configured to exert a maximum biasing force regardless of the position of the shade.

With reference again to FIGS. 13A-13D and 4B, as roller 138 rotates in the first rotation direction R1, engagement disk 206 of positioning device 144 rotates correspondingly. This may be because engagement disk 206 is keyed to the roller ridge 154 through the key 260 (see FIG. 4B). The engagement disk 206 may rotate around the retainer axle 212 of the retainer housing 200 (which is stationary). In other words, as briefly explained above, the engagement disk 206 is rotatably connected to the roller, but other components of the positioning device may be non-rotatably connected to the roller, such as the retainer housing 200, which is stationary.

As the engagement disk 206 rotates, the clutch spring 208 is biased open as the spool tab 302, which is received into the spring slot 282 of the spool collar 276, is biased in a direction opposite of the windings. That is, the spool tab 302 is biased in a direction which would unwind the clutch spring 208. Although the clutch spring 208 is open, the extending force F, which is typically applied by a user, is greater than a bias of the clutch spring 208. The biasing force thus provides a tactile feeling of retraction to a user as the user pulls the end rail 106 of the shade 102 downwards. In other words, the biasing force of the clutch spring 208, even with the clutch in the open position, provides some resistance as the user extends the shade 102, which may provide a pleasing feel to a user. Additionally, the pins 244 of the shuttle 202 engage the outer surface of the spool as the spool rotates, also providing a tactile feel to the user.

With continued reference to FIGS. 13A-13D, as the extension force F is being applied to the end rail 106 the shuttle 202 translates laterally (and in this case axially) along the spool 204 and the pin 244 is encouraged by the contoured track shape to move into the lower seat 298. The lower seat 298 provides a parking area for the pins 244, 246 on the pin engagement surface 274. When the pin 244 is cradled within the lower seat 298, the spool 204 may not rotate even as engagement disk 206 continues rotating. However, because the clutch spring 208 is biased open by its connection spool 204, the engagement disk 206 can rotate with the roller.

Figure 14A:
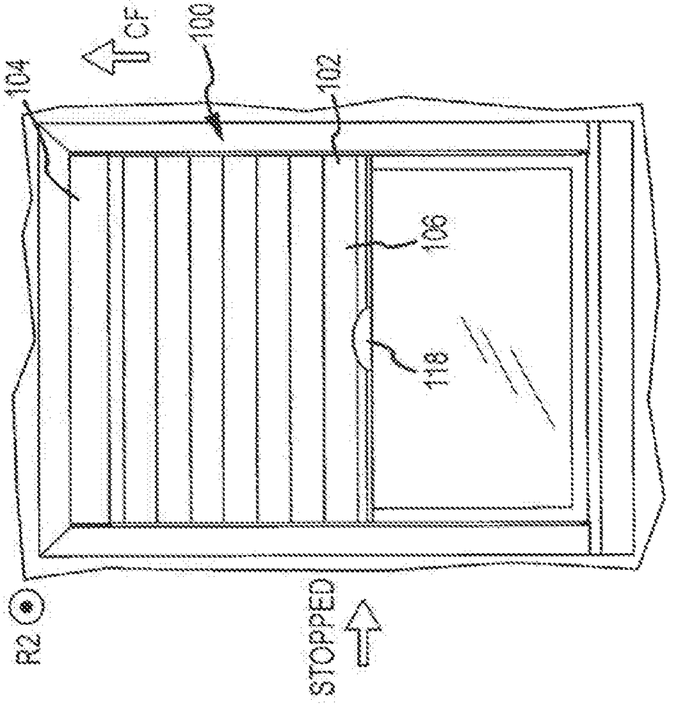
FIG. 14A is a front perspective view of the retractable shade stopped in a desired position.
Figure 14B:
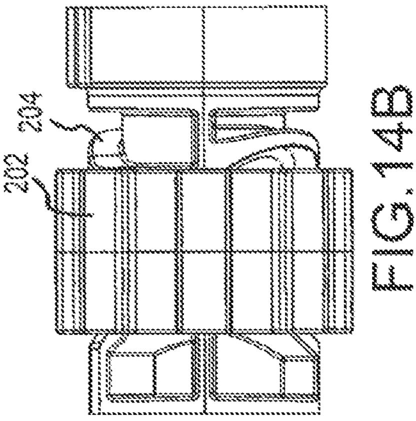
FIG. 14B is a side elevation view of the shuttle position on the spool when the shade is locked in a desired position.
Figure 14C:
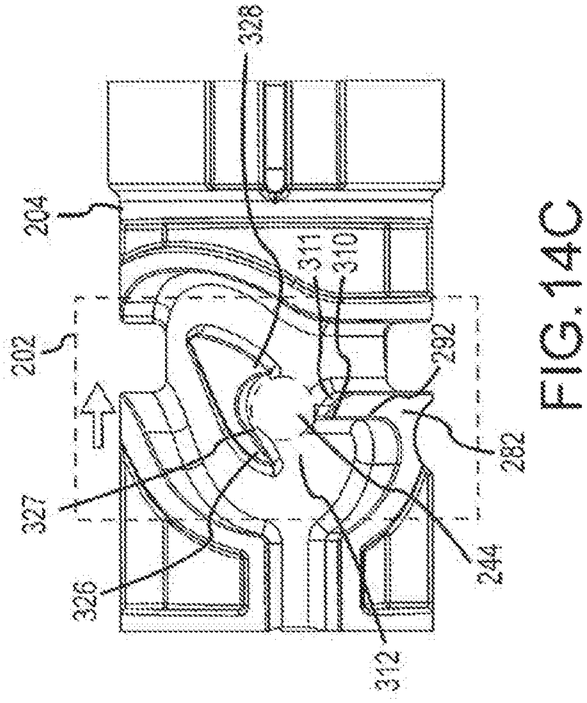
FIG. 14C illustrates the same view as FIG. 14B but with the shuttle shown in phantom to illustrate the position of the shuttle pins on the spool.
Figure 14D:
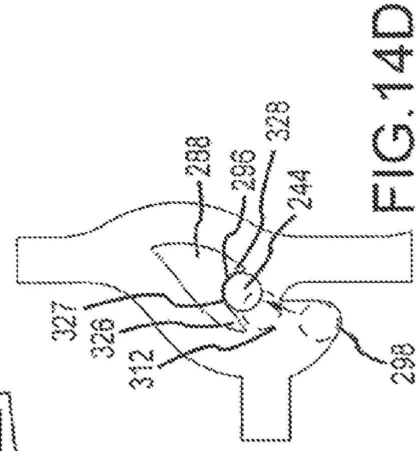
FIG. 14D is a simplified schematic view of the one half of the pin engagement surface illustrating the position of the shuttle pin when the shade is locked in position.

As the shade 102 is being extended, the user may wish to stop the shade 102 at a particular position. FIG. 14A is a front perspective view of the shade 102 stopped in a desired position. FIG. 14B is a side elevation view of the shuttle position on the spool when the shade is locked in a desired position. FIG. 14C illustrates the same view as FIG. 14B but with the shuttle shown in phantom to illustrate the position of the pin 244. FIG. 14D is a simplified schematic view of the one half of the pin engagement surface illustrating the position of the shuttle pin when the shade is locked in position. As the shade 102 is extended the retraction motors 142*a*, 142*b*, and specifically the flat springs 158, are wound tighter as the outer tab 182 is wrapped around the core 178 by the rotation of the shell 156. Once the force rotating the roller in the first rotation direction R1 is removed, the flat spring 158 of the retraction motors 142*a*, 142*b* exerts a clock spring force CF in a second rotation direction R2. In some embodiments, such as the covering 100 illustrated in FIG. 14, the second rotation direction R2 may be forward or away from the concealing rail 128.

As the roller 138 is rotated by the retraction motors 142*a*, 142*b* forward in the second rotation direction R2 (illustrated in FIG. 14A as coming out of the page), the spool 204, which is connected to the roller 138 via the boss 256 on the engagement disk 206, rotates in the second rotation direction R2. That is, the spring force CF rotates the roller 138 in the second rotation direction R2, which causes the engagement disk 206 and the spool 204 to also rotate in the second rotation direction R2. The spool 204 rotates underneath the pin 244 and the grooves/pathways guide the pin 244, and thus the shuttle 202, along the spool 204 surface.

As the spool 204 rotates forwardly, the position of the pin 244 relative the spool changes based on the channel pathway 312. In this case, the pin are guided by the contours 292 along the channel walls 282) are guided generally radially relative to the spool by the sidewall 311 of tip 310 along path 312. As rotation continues, the pin 244 crosses path 312 and contacts sidewall 327, which is angled to deflect and guide the pin 244 into the upper seat 296. As the pin 244 is directed by the release diversion tip 310 and contacts the sidewall surface 327, and pin 244 moves accordingly, the shuttle 202 is moved and travels laterally along a length of the spool and the retainer housing 200.

Figure 14E:
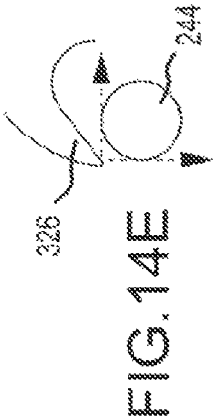
FIG. 14E is an enlarged view of the seat diversion tip on the spool as it engages the pins.

As the spool 204 moves, the pin 244 engage the sidewall 327 of the tip 326 closest to the upper seat 296, and the sidewall 327 pushes the pin 244 towards the upper seat 296. FIG. 14E is an enlarged view of the seat diversion tip 326 as it engages the pin. With reference to FIGS. 14C-14E, as the seat diversion tip 326 engages the pin 244, the pin 244 (and thus the shuttle) is guided laterally at an angle towards the upper seat 296.

When the pin 244 is moved into the upper seat 296 defined on a bottom surface of the diverting island 288, the positioning device 144 enters the locked position. In the locked position, the clutch spring 208 is in fixed compression as the spool tab 302 is biased in the clamping direction. The bias of the clutch spring 208 along with the position of the pin 244 in the upper seat 296, the spool and the engagement disk 206 are prevented from rotating further in the second rotation direction R2. Additionally, the main pathway tip 328 acts to hold the pin 244 within the upper seat 296. It should be noted that the seat diversion tip 326, the main pathway tip 328, and other tips formed on the spool 204 may be sized and angled to direct the pin 244 as desired.

The spool tang 302 of the clutch spring 208 is biased in the closed position due to the locked position of the pin 244 and the force exerted by the engagement disk. The clutch spring 208 therefore clamps, preventing rotation of the engagement disk in the second rotation direction R2. The clutch spring 208, as well the engagement of the pin 244 in the upper seat 296 counter the clock spring force and prevent the shade 102 from being further retracted. Additionally, without a downward force F on the end rail 106, the shade 102 is held in the position selected the user. In other words, the positioning device 144 counteracts the retraction force the retraction motors 142*a*, 142*b* because the pin is seated in the upper seat and prevents the spool and thus the engagement disk from rotating in the second rotation direction R2. Absent any downward force F by a user to disengage the clutch 208 by unseating the pin from seat 296, the shade 102 may generally remain in the position where the downward force F was first removed (it may rotate slightly upwards due to the initial clock spring force CF, but that height difference may be minor, e.g., due to partial rotation of the roller 138).

The positioning device 144 may be activated to lock the shade 102 in substantially any position along a drop length of the shade 102. This is possible because once the downward force F (which is typically applied by a user) is removed, the retraction motors 142*a*, 142*b* move the roller 138 and the positioning device 144 into the locked position. The locked position does not require that the shade 102 be in a particular location, but only that the downward force F is removed. Thus, the positioning device 144 allows the shade 102 to be operated without operating cords and be stopped and held in position at substantially any location along its drop length.

Figure 15C:
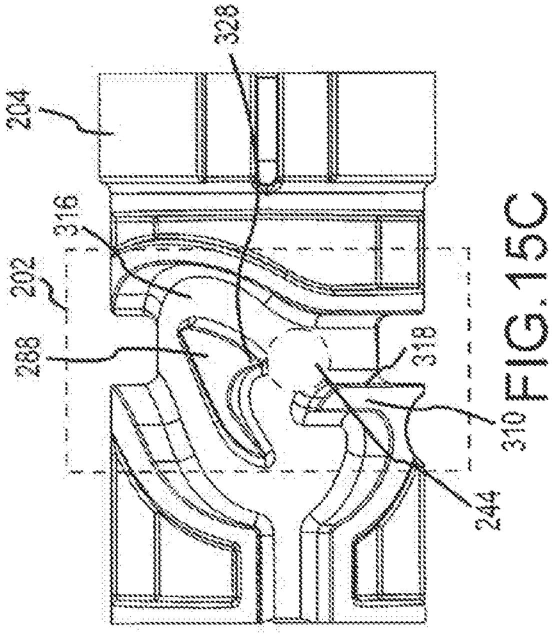
FIG. 15C illustrates the same view as FIG. 15B but with the shuttle shown in phantom to illustrate the position of the shuttle pins on the spool.
Figure 15B:
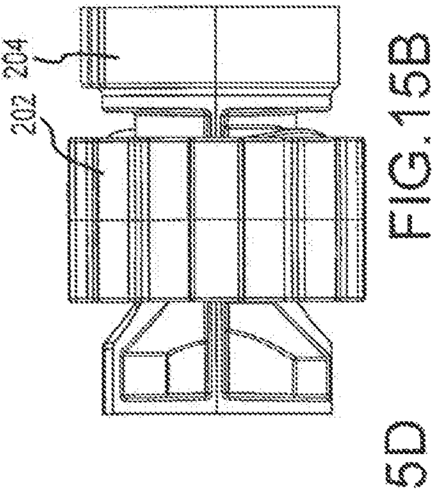
FIG. 15B is a side elevation view of the shuttle position on the spool as the shade transitions between a locked position and being extended or retracted.
Figure 15A:
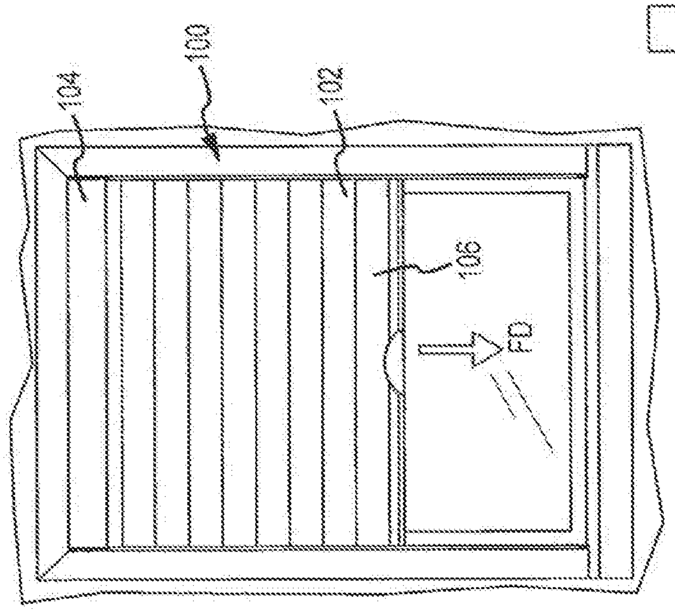
FIG. 15A is a front perspective view of the retractable shade as it is moved from a locked position.
Figure 15D:
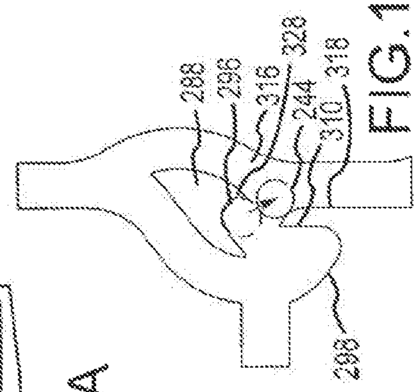
FIG. 15D is a simplified schematic view of the one half of the pin engagement surface illustrating the position of the shuttle pin as the shade transitions between a locked position and being extended or retracted.

Once locked, the shade 102 can be moved to another position. For example, the shade 102 may be extended further, retracted completely, or retracted partially to another position. FIG. 15A is a front perspective view of the shade 102 as it is moved from a locked position. FIG. 15B is a side elevation view of the shuttle position on the spool as the shade transitions between a locked position and being extended or retracted. FIG. 15C illustrates the same view as FIG. 15B but with the shuttle shown in phantom to illustrate the position of the pin 244. FIG. 15D is a simplified schematic view of the one half of the pin engagement surface illustrating the position of the shuttle pin as the shade transitions between a locked position and being extended or retracted. Once the shade 102 is locked in a select position, to extend or retract the shade 102 the user applies a downward disengaging force FD. The downward disengaging force FD may be similar to the extension force F, but in instances where the user may wish to retract the shade, may be a lower magnitude than the extension force F.

As the disengaging force F is applied to the end rail 106, the clutch opens and the engagement disk 206 rotates, rotating the spool 204, to disengage the pin 244 from its parked location in the upper seat 296. The pins 244, 246 engage the main pathway tip 328 which pushes the pins 244, 246 towards the release diversion 310. Then, as the pins 244, 246 disengage from the upper seat 296, the pins 244, interact with the contoured peak of the release diversion tip 310 and along the angled sidewall 318 of the tip which causes the shuttle 202 to move laterally towards the collar 276. The release diversion tip 310, as well as the angled sidewall 318, is contoured to direct the pin 244 into the movement pathway 316. Additionally, the pathway tip 328 may be slight curved away from the main pathway 316, to avoid engaging the pin 244 as they transition from the release diversion tip to the main pathway 316. Once the pin 244 has become disengaged from the upper seat 296 entered the movement pathway 316, the shade 102 is unlocked and can be either retracted or extended.

Figure 16C:
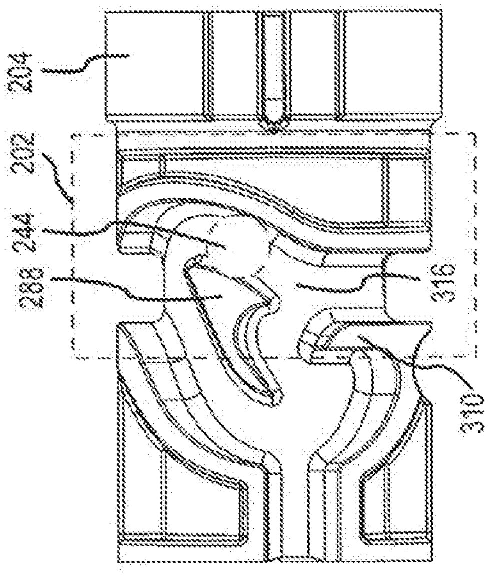
FIG. 16C illustrates the same view as FIG. 16B but with the shuttle shown in phantom to illustrate the position of the shuttle pins on the spool.
Figure 16B:
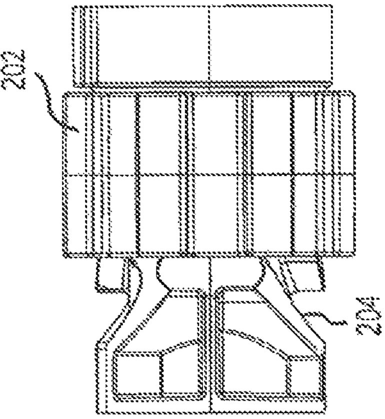
FIG. 16B is a side elevation view of the shuttle position on the spool as the shade is retracted.
Figure 16A:
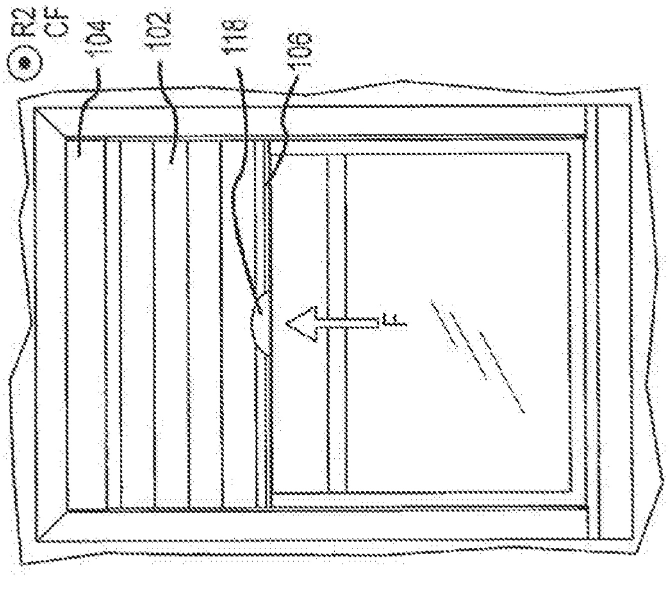
FIG. 16A is a front perspective view of the retractable shade being retracted.
Figure 16D:
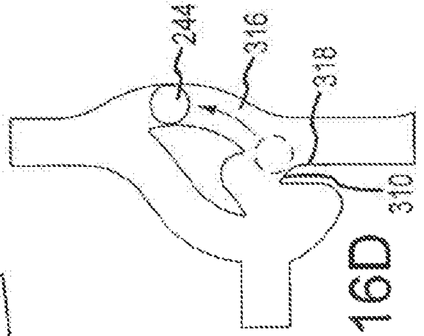
FIG. 16D is a simplified schematic view of the one half of the pin engagement surface illustrating the position of the shuttle pin when the shade is retracting.

Once unlocked if a user does not apply the extension force F to counteract the force of the retraction motors 142*a*, 142*b*, the shade may be retracted. FIG. 16A is a front perspective view of the shade 102 retracted. FIG. 16B is a side elevation view of the shuttle position on the spool as the shade is retracted. FIG. 16C illustrates the same view as FIG. 16B but with the shuttle shown in phantom to illustrate the position of the pin 244. FIG. 16D is a simplified schematic view of the one half of the pin engagement surface illustrating the position of the shuttle pin when the shade is retracting. As the pin 244 is disengaged from the upper seat 296 and encounters the sidewall 318 of the release diversion tip 310, the contoured wall of the sidewall 318 directs the pin 244 into the main pathway 316. Once in the main pathway 316, and with no user extension force F applied to counteract them, the retraction motors 142*a*, 142*b* may exert a forward rotation or clock spring force CF on the roller 138, causing the roller 138 to rotate forwardly and retract the shade 102.

As the roller 138 rotates, the shuttle 202 remains orientated above the main pathway 316, with the pin 244 traveling along the length of the main pathway 316. The main pathway 316 may be a relatively continuous pathway and may not include a diverting tip or island. Thus, when the pin 244 is in the pathway, is may be rotated around the spool 204, without being substantially directed or blocked. For example, the main pathway 316 extends circumferentially around the outer surface of the spool, such that the pin may travel along the entire circumference of the spool. Because the pin 244 is allowed to travel within the main pathway 316 and the spool 204 is free to rotate, the clutch spring 208 may be disengaged as both the spool tang 302 and the disk tang 304 may be rotating together. Thus, the clutch spring 208 allows the retraction motors 142*a*, 142*b* to use the stored bias energy to retract the shade 102. That is, the clutch spring is open to allow the engagement disk to rotate. It should be noted that without an intervening user force to counteract the retraction motors, the motors may continue to wind the shade (with the pin freely traveling in the main pathway), until the shade is completely wrapped around the roller.

Figures 17A, 17B, 17C, 17D:
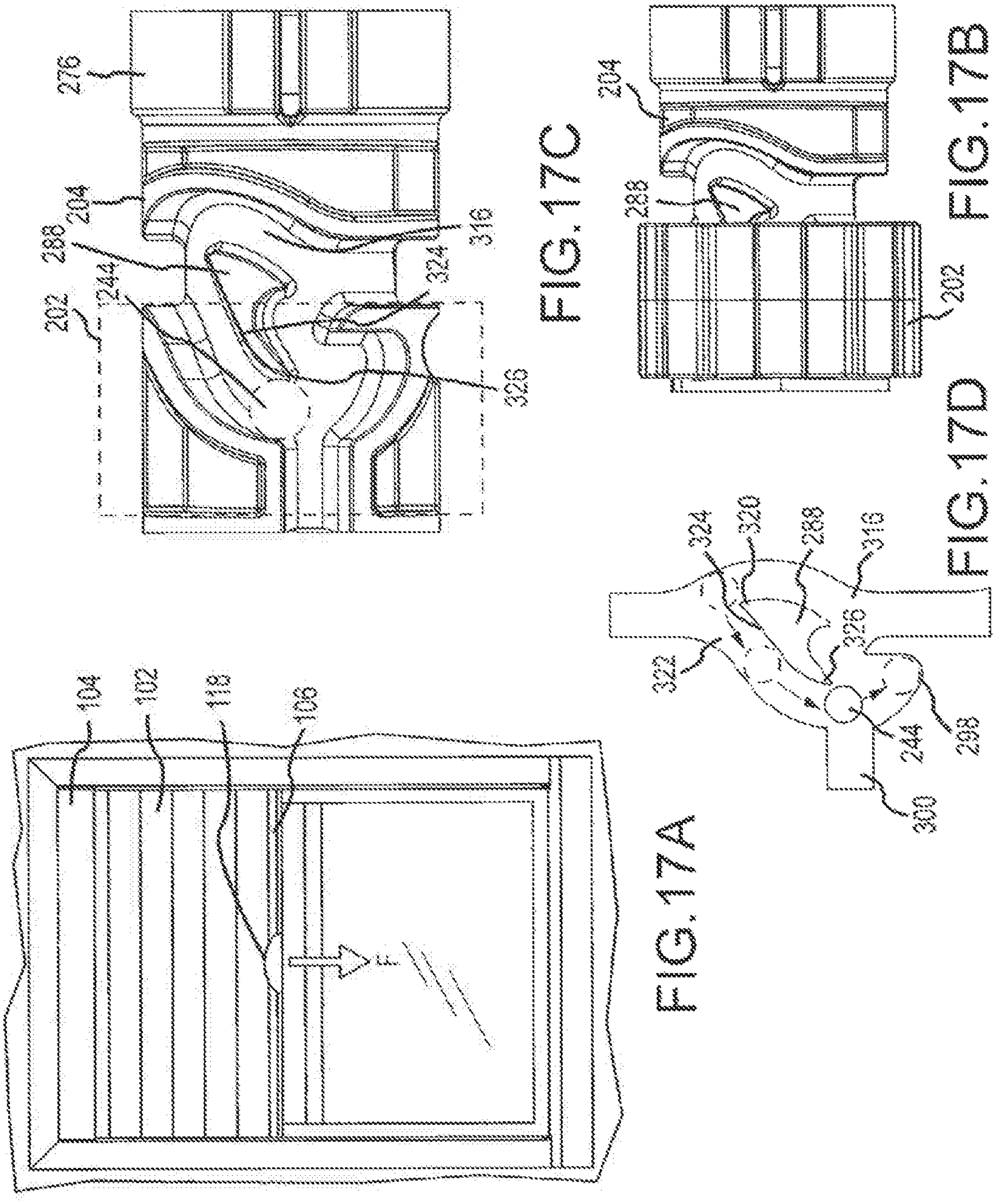
FIG. 17A is a front perspective view of the shade transitioning between the locked position and being extended.
FIG. 17B is a side elevation view of the shuttle position on the spool when the shade is being extended from a locked position.
FIG. 17C illustrates the same view as FIG. 17B but with the shuttle shown in phantom to illustrate the position of the shuttle pins on the spool.
FIG. 17D is a simplified schematic view of the one half of the pin engagement surface illustrating the position of the shuttle pin when the shade is being extended from the locked position.

During retraction of the shade, if a user wishes to stop the shade 102 at a particular location (or after the shade was locked the user wishes to further extend the shade 102), the pin may be directed to the extending pathway. FIG. 17A a front perspective view of the shade 102 transitioning between the locked position being extended. FIG. 17B is a side elevation view of the shuttle position on the spool when the shade is being extended from a locked position. FIG. 17C illustrates the same view as FIG. 17B but with the shuttle shown in phantom to illustrate the position of the pin 244. FIG. 17D is a simplified schematic view of the one half of the pin engagement surface illustrating the position of the shuttle pin when the shade is extended from the locked position.

Once the shade 102 has been unlocked as illustrated in FIGS. 16A-16D and the pin 244 is in the main pathway 316, the user may apply the downward extension force F to the end rail 106. As the user applies the extension force F on the end rail 106, the roller 138 will begin to rotate in the first rotation direction R1 or backwards. The rotation of the roller 138 causes the spool 204 (keyed with the engagement disk 206) to rotate in the first rotation direction D1. The first rotation direction D1 is the opposite of the retraction or second rotation direction D2. The reverse rotation direction causes the pin 244 of the shuttle 202 to encounter the angled wall of the locking diversion tip 320 formed on the directing island 288. The locking diversion tip 320 directs the pin 244 to enter the extension pathway 322 as the pin 244 is guided by the contoured sidewall 324 of the directing island 288. At the end of the contoured sidewall 324, the pin 244 interacts with the seat diversion tip 326 and its angled sidewall, the seat diversion tip then directs the pin 244 into the lower seat 298. Once in the lower seat 298, the user may continue to extend the shade 102 as described above with respect to FIGS. 13A-13D. In some embodiments, the clutch spring 208 may be engaged until the pins 244, 246 enter the lower seat 298.

Figure 18A:
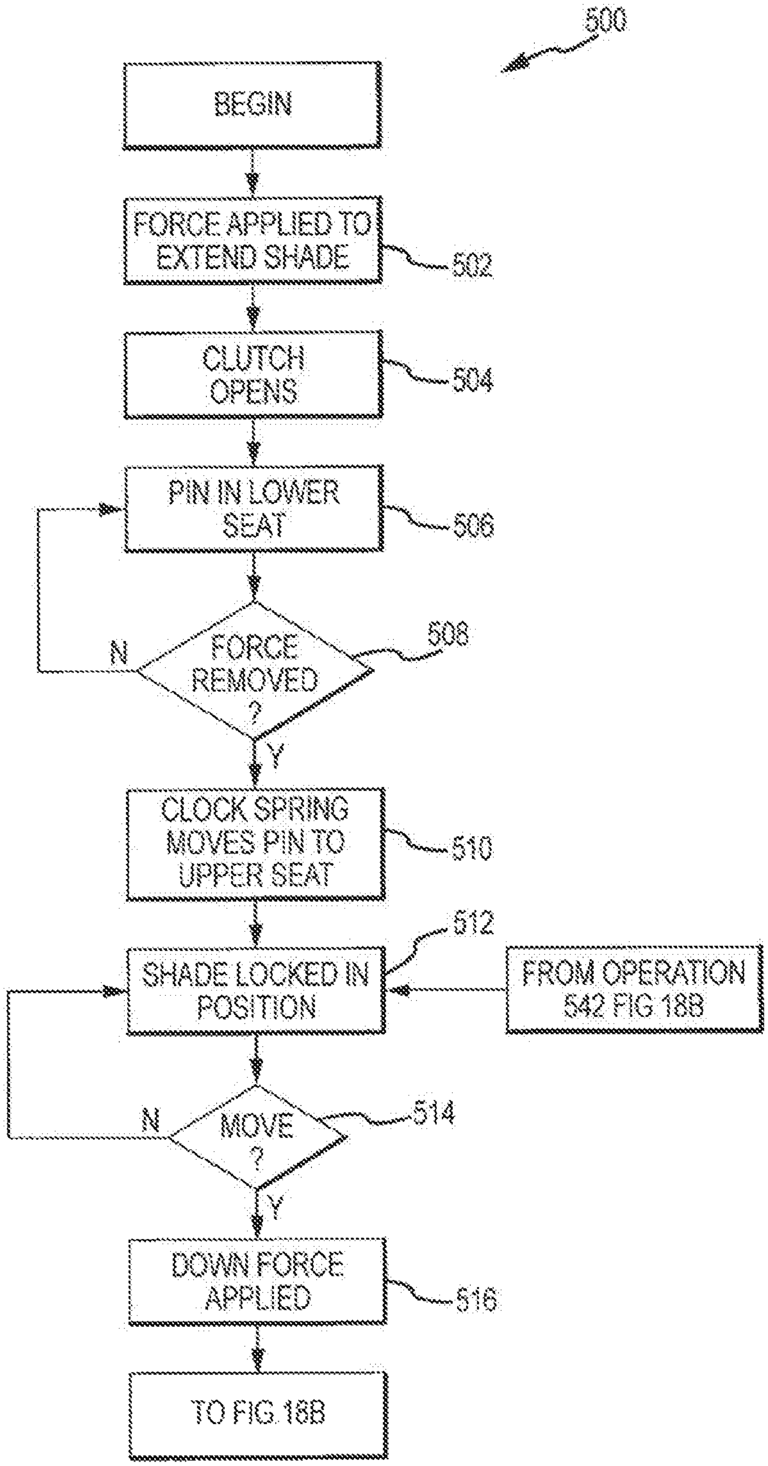
FIG. 18A is a first portion of a flow chart illustrating a method for operating a retractable covering including the positioning device.
Figure 18B:
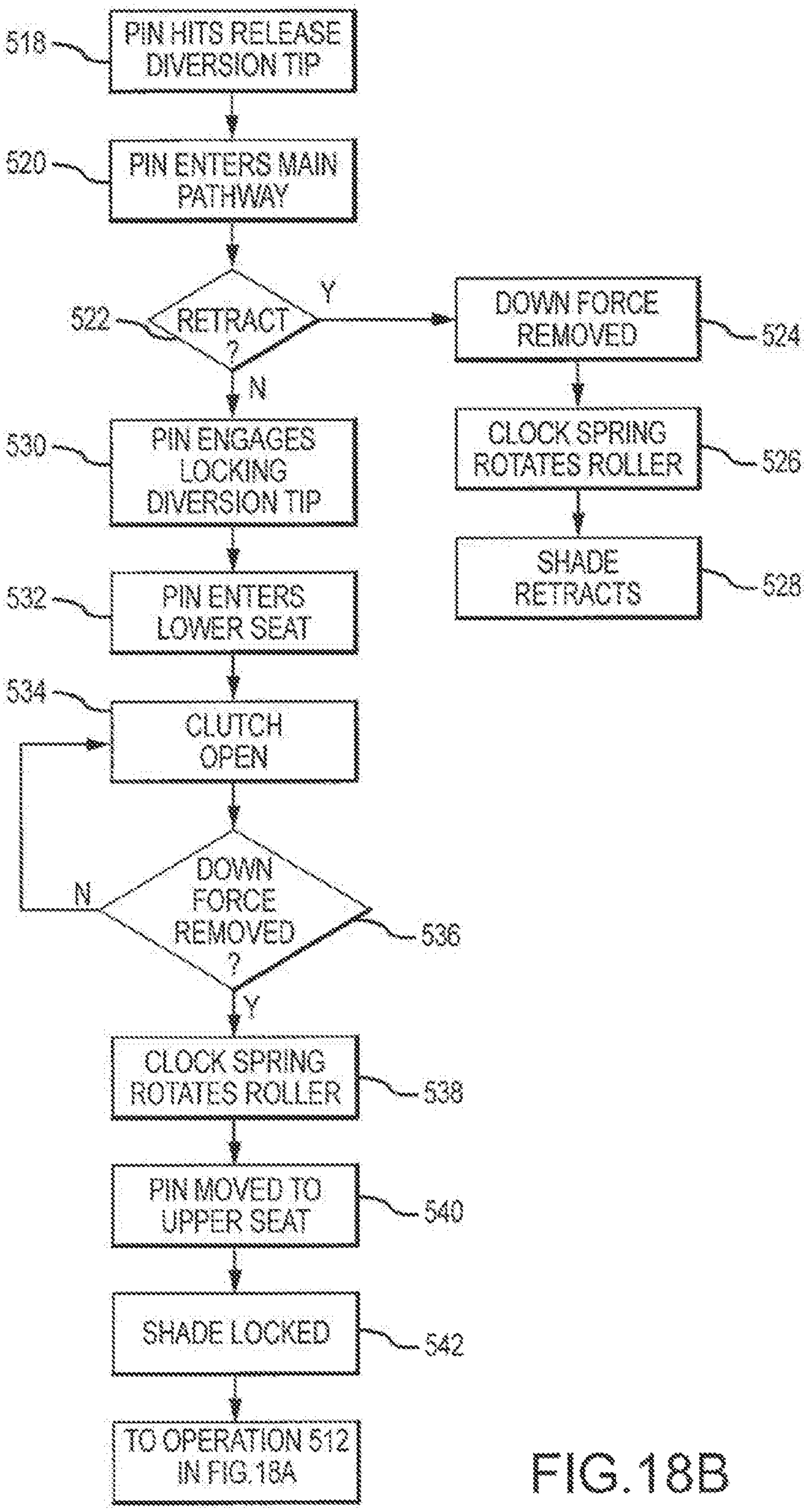
FIG. 18B is the second portion of the flow chart of FIG. 18A illustrating the method for operating the retractable covering including the positioning device.

A method further detailing the operation of the covering 100 and specifically the locking and unlocking of the positioning device 144 will now be discussed in further detail. FIGS. 18A and 18B illustrate a method 500 for operating the covering 100. With reference to FIG. 18A, the method 500 may begin with operation 502 and a force may be applied to extend the shade 102. As discussed above with respect to FIGS. 13A-13D, the extension force F may be applied by a user pushing down on the end rail 106 (such as by grasping the finger grip 118 and pulling downward). As the force is being applied to the end rail 106, the method 500 may proceed to operation 504 and the clutch spring 208 may be biased open, with the continued extension force F and the clutch spring 208 biased open, the method 500 may proceed to operation 506. In operation 506 the pin 244 of the shuttle 202 may be seated within the lower seat 298.

While the pin 244 is in the lower seat 298, the method 500 may proceed to operation 508. In operation 508 the positioning device 144 may determine the extension force F has been removed. If the extension force F has not yet been removed, the method 500 may return to operation 506 and the pin 244 may remain in the lower seat 298. In this position, as described above, the user may continue to extend the shade and the clutch spring 208 may be open allowing the roller 138 to rotate in the first rotation direction R1 as the user extends the shade 102.

However, if in operation 508 the extension force F is removed, the method 500 may proceed to operation 510. In operation 510, the retraction motors 142*a*, 142*b* exert a clock spring force CF in the second rotation direction R2 to rotate the roller 138. The rotation of the roller 138 may be limited to a partial rotation, because as the roller 138 rotates, the pin 244 may move from the lower seat 298 to the upper seat 296. Once the pin 244 is locked in position, the method 500 may proceed to operation 512. In operation 512, the retraction motors 142*a*, 142*b* may be prevented from rotating the roller 138 as the pin 244 may lock the spool 204 and prevent the spool 204 (which is operably connected to the roller 138) from rotating. Accordingly, at operation 512, the shade 102 may be substantially held in the position where the user released the extension force F.

Once the shade 102 is held in a select position, the method 500 may proceed to operation 514 and the shade may be moved, either to be extended or retracted. If in operation 514 a user does not want to move the shade, the method 500 may proceed again to operation 512 and the shade 102 may be held in position. However, if in operation 514 a user wishes to move the shade 102, the method may proceed to operation 516. In operation 516 a downward force, such as the extension force F, may be applied to the end rail 106.

As the downward force F is applied, the method 500 may proceed to operation 518 (shown in FIG. 18B). With reference to FIG. 18B, as the downward force F is applied, the method 500 may proceed to operation 518 and the spool 204 may be rotated to move the pins 244, 246 so that they each engage with the release diversion tip 310. Once the pin 244 interacts with the release diversion tip 310, the method 500 may proceed to operation 520. In operation 520, as discussed above with respect to FIGS. 15A-15D, the pin 244 is directed by the contoured sidewall 318 into the main pathway 316.

Once the pin 244 is positioned in the main pathway 316, the shade may be further extended or retracted. Accordingly, after operation 520, the method 500 may proceed to operation 522. In operation 522 the user may determine to retract the shade 102. If the shade 102 is to be retracted, the method 500 to operation 524 and the end rail 106 no longer experiences the downward force F. That is, the user removes the downward force F. Once the downward force F has been removed, the method 500 proceeds to operation 526 and the rotation motors 142*a*, 142*b*, and specifically, the springs 158 rotate the roller 138. As described with respect to FIGS. 16A-16D, the biasing force exerted by the springs 158 rotates roller 138 in the second rotation direction R2. As the roller 138 rotates in the second rotation direction R2, the method 500 may proceed to operation 528 and the shade 102 winds around the roller 138 and retracts. It should be noted that the user may cause the retraction at substantially any time to position the shade as desired by applying downward extension force on the end rail 106.

In operation 522, a user chooses to extend the shade 102 further, rather than retract the shade 102, the method 500 may proceed to operation 530. In operation 530, a downward force F may be applied to the end rail 106 and the pin 244 may engage the locking diversion tip 320. As the pin 244 interacts with the locking diversion tip 320 it is guided by the sidewall 324 of the diverting island 288. As the pin 244 is guided by the sidewall 324, the method 500 may proceed to operation 532 and the pin 244 may enter the lower seat 298.

Once the pin 244 is in the lower seat 298, the method 500 may proceed to operation 534 and the clutch spring 208 may be biased open. The clutch spring 208 may thus allow a user to extend the shade 102 by allowing the engagement disk 206 to rotate with the roller 138. After operation 534, the method 500 may proceed to operation 536 and the user may remove the downward force F. If in operation 536 the user does not remove the downward force F, the method 500 may return to operation 534 and the clutch spring 208 may remain open, allowing a user to continue to extend the shade 102. However, if in operation 536, the downward force F is removed, the method 500 may proceed to operation 538 and the retraction motors 142*a*, 142*b* may rotate the roller 138 a partial rotation. In other words, once the downward force F is removed, the retraction motors 142*a*, 142*b* may exert a biasing force on the roller 138 to rotate it in the second rotation direction R2.

As the retraction motors 142*a*, 142*b* rotate the roller 138, the pin 244 may be moved into the upper seat 296. Once the pin 244 is engaged in the upper 296, the roller 138 may be prevented from rotating the second rotation direction R2 and thus the biasing force exerted by the retraction motors 142*a*, 142*b* may Without an additional downward force by the user, the method 500 may proceed to operation 542 and the shade 102 may be locked at substantially the location where downward force F was removed. Thus, the user may position the shade 102 substantially anywhere along its vertical drop length. Once the shade 102 is locked, the method may return to operation 514 illustrated in FIG. 18A.

Although the present disclosure has been described with a certain degree of particularity, it is understood the disclosure has been made by way of example, and changes in detail or structure may be made without departing from the spirit of the disclosure as defined in the appended claims.

The foregoing description has broad application. For example, while examples disclosed herein may focus on the particular operating elements and particular spring types and arrangements, vane orientation stop mechanism structures, etc. it should be appreciated that the concepts disclosed herein may equally apply to other structures that have the same or similar capability to perform the same or similar functions as described herein. Similarly, the discussion of any embodiment or example is meant only to be explanatory and is not intended to suggest that the scope of the disclosure, including the claims, is limited to these examples.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, and do not create limitations, particularly as to the position, orientation, or use of this disclosure. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The drawings are for purposes of illustration only and the dimensions, positions, order and relative sizes reflected in the drawings attached hereto may vary.

What is claimed is:

1. A covering for architectural openings, the covering comprising:

a roller;

a shade wrapped around the roller, the shade configured to extend from or retract onto the roller when the roller rotates;

a retraction motor operably coupled to the roller for biasing the roller in a direction to retract the shade, wherein the retraction motor includes a spring having a first end rotatable with the roller and a second end fixed against rotation of the roller, wherein rotation of the roller unwraps or further wraps the spring to store energy therein; and a positioning device including:

a circumferential track including at least one seat;

a pin moveable within the circumferential track, wherein the pin selectively enters a first position defined at the at least one seat of the circumferential track to hold the shade at a selected extension location while the pin is in the at least one seat of the circumferential track, and the pin is selectively releasable from the at least one seat of the circumferential track to a second position for additional extension or retraction of the shade relative to the selected extension location; and a translation member coupled to the pin, and configured to laterally translate the pin with respect to a length of the roller.

2. The covering of claim 1, wherein the circumferential track of the positioning device is embedded within a spool concentric with the roller.

3. The covering of claim 2, wherein a location of engagement between the pin and the spool determines whether the roller can rotate or whether the roller is prevented from rotating.

4. The covering of claim 2, wherein the pin extends radially inwardly from an annular member positioned around the spool.

5. The covering of claim 1, wherein the pin comprises one of a pair of opposing radially-extending pins engaging the circumferential track.

6. The covering of claim 1, wherein the circumferential track further includes a release pathway adjacent to the seat, wherein the positioning device unlocks the roller in response to the pin entering a third position within the release pathway.

7. The covering of claim 1, wherein the spring comprises a flat spring.

8. The covering of claim 1, wherein the positioning device further includes an entry channel shaped to receive the pin, wherein the pin passes through the entry channel to engage the circumferential track.

9. A method for operating a covering for an architectural opening, the method comprising:

moving a shade about a roller in a first direction to a first position, wherein a retraction mechanism of the covering applies a biasing force in a second direction opposite the first direction during the moving, wherein the retraction mechanism includes a spring having a first end rotatable with the roller and a second end fixed against rotation of the roller, wherein rotation of the roller unwraps or further wraps the spring to store energy therein; and moving the shade about the roller in the second direction from the first position to hold the shade at a selected extension location, elected position, wherein moving the shade in the second direction from the first position causes a positioning device to counteract the biasing force and lock the shade with respect to the roller, wherein the positioning device includes:

a circumferential track including at least one seat;

a pin engaging the circumferential track, wherein the pin selectively enters a first position defined at the at least one seat of the circumferential track to hold the shade at the selected extension location while the pin is in the at least one seat of the circumferential track, and the pin is selectively releasable from the at least one seat of the circumferential track to a second position for additional extension or retraction of the shade relative to the selected extension location; and a translation member coupled to the pin, and configured to laterally translate the pin with respect to the spool.

10. The method of claim 9, further comprising threading the pin through an entry channel of the positioning device to engage the pin with the circumferential track.

11. The method of claim 9, further comprising moving the shade in the first direction, after moving the shade about the roller in the second direction, to unlock the shade with respect to the roller.

12. The method of claim 9, wherein positioning device is embedded within a spool concentric with the roller, wherein moving the shade about the roller in the first direction retains the spool during rotation of the roller.

13. A shade comprising:

a roller;

at least one sheet operably connected to the roller;

a retraction motor operably connected to the roller, wherein the retraction motor exerts a biasing force to bias the roller in a first direction, wherein the retraction motor includes a flat spring having a first end rotatable with the roller and a second end fixed against rotation of the roller, wherein rotation of the roller unwraps or further wraps the spring to store energy therein; and a positioning device operably connected to the roller, wherein the positioning device includes:

a spool having a circumferential track on an outer surface thereof, the circumferential track including at least one seat;

a radially inwardly-extending pin engaging the circumferential track of the spool, wherein the radially inwardly-extending the pin selectively enters a first position defined at the at least one seat of the circumferential track to hold the spool and shade at a selected extension location while the pin is in the at least one seat of the circumferential track, and the pin is selectively releasable from the at least one seat of the circumferential track to a second position for additional extension or retraction of the shade relative to the selected extension location; and a translation member coupled to the pin, and configured to laterally translate the pin with respect to the spool.

14. The shade of claim 13, wherein the spool is concentric with the roller.

15. The shade of claim 13, wherein the at least one sheet is configured to extend from the roller when the roller rotates in a first direction, or retract onto the roller when the roller rotates in a second direction.

* * * * *